(12) United States Patent
Sleeman et al.

(10) Patent No.: US 8,154,529 B2
(45) Date of Patent: Apr. 10, 2012

(54) TWO-DIMENSIONAL TOUCH SENSORS

(75) Inventors: Peter Sleeman, Waterlooville (GB); Martin John Simmons, Southampton (GB); Daniel Pickett, Lee-on-the Solent (GB); Christopher Ard, Eastleigh (GB)

(73) Assignee: Atmel Corporation, San Jose, CA (US)

( * ) Notice: Subject to any disclaimer, the term of this patent is extended or adjusted under 35 U.S.C. 154(b) by 359 days.

(21) Appl. No.: 12/466,270

(22) Filed: May 14, 2009

(65) Prior Publication Data

US 2010/0289754 A1 Nov. 18, 2010

(51) Int. Cl.
 *G06F 3/041* (2006.01)
(52) U.S. Cl. ......... 345/173; 345/174; 345/175; 715/863
(58) Field of Classification Search .......... 345/173–175; 715/863
 See application file for complete search history.

(56) References Cited

U.S. PATENT DOCUMENTS

| | | | |
|---|---|---|---|
| 5,404,442 A | 4/1995 | Foster et al. |
| 5,434,929 A | 7/1995 | Beernink et al. |
| 5,463,696 A | 10/1995 | Beernink et al. |
| 5,730,165 A | 3/1998 | Philipp |
| 5,764,218 A | 6/1998 | Della Bona et al. |
| 6,380,929 B1 | 4/2002 | Platt |
| 6,414,671 B1 | 7/2002 | Gillespie et al. |
| 6,452,514 B1 | 9/2002 | Philipp |
| 6,466,036 B1 | 10/2002 | Philipp |
| 6,888,536 B2 | 5/2005 | Westerman et al. |
| 7,046,230 B2 | 5/2006 | Zadesky et al. |
| 7,920,129 B2 | 4/2011 | Hotelling |
| 8,031,094 B2 | 10/2011 | Hotelling |
| 8,031,174 B2 | 10/2011 | Hamblin |
| 2005/0024341 A1 | 2/2005 | Gillespie et al. |
| 2005/0156881 A1 | 7/2005 | Trent, Jr. |
| 2006/0038791 A1 | 2/2006 | Mackey |
| 2006/0066582 A1 | 3/2006 | Lyon et al. |
| 2006/0097991 A1 | 5/2006 | Hotelling et al. |
| 2006/0187214 A1 | 8/2006 | Gillespie et al. |
| 2006/0250377 A1 | 11/2006 | Zadesky et al. |

(Continued)

FOREIGN PATENT DOCUMENTS

EP 0818751 A1 1/1998

(Continued)

*Primary Examiner* — Amare Mengistu
*Assistant Examiner* — Koosha Sharifi-Tafreshi
(74) *Attorney, Agent, or Firm* — Baker Botts L.L.P.

(57) ABSTRACT

In a touch sensor, as well as providing touch position data, additional data is provided on the shape of the touch. This is achieved by having sampling nodes on a finer mesh than the size of the actuating object, typically a finger, so each finger touch activates a group of adjacent nodes on the sensor. In this way, each touch has a shape formed by the activated nodes. The shape allows the touch sensor to report an angle with each touch and data indicating how elongate the touch is, preferably both together as a vector in which the direction of the vector gives the angle and the magnitude of the vector gives the ellipticity. For each frame of data collected from the sensor array, the sensor outputs an (x, y) coordinate of touch position and a further (x, y) coordinate of a shape vector. This allows many novel gestures to be provided, such as single finger "drag and zoom" and single finger "drag and rotate". It also allows for correction of systematic human error in the placement of finger touches on virtual keys.

20 Claims, 13 Drawing Sheets

U.S. PATENT DOCUMENTS

| | | |
|---|---|---|
| 2006/0274055 A1 | 12/2006 | Reynolds et al. |
| 2007/0109274 A1 | 5/2007 | Reynolds |
| 2007/0119698 A1 | 5/2007 | Day |
| 2007/0132789 A1 | 6/2007 | Ording et al. |
| 2007/0146337 A1 | 6/2007 | Ording et al. |
| 2007/0150826 A1 | 6/2007 | Anzures et al. |
| 2007/0150842 A1 | 6/2007 | Chaudhri et al. |
| 2007/0152979 A1 | 7/2007 | Jobs et al. |
| 2007/0152984 A1 | 7/2007 | Ording et al. |
| 2007/0157089 A1 | 7/2007 | Van O's et al. |
| 2007/0159184 A1 | 7/2007 | Reynolds et al. |
| 2007/0176906 A1 | 8/2007 | Warren |
| 2007/0177804 A1 | 8/2007 | Elias et al. |
| 2007/0222766 A1 | 9/2007 | Bolender |
| 2007/0236475 A1 | 10/2007 | Wherry |
| 2007/0247429 A1 | 10/2007 | Westerman |
| 2007/0257890 A1 | 11/2007 | Hoteling et al. |
| 2007/0262951 A1 | 11/2007 | Huie et al. |
| 2007/0279394 A1 | 12/2007 | Lampell et al. |
| 2007/0283263 A1 | 12/2007 | Zawde et al. |
| 2008/0007533 A1 | 1/2008 | Hotelling |
| 2008/0012837 A1 | 1/2008 | Marriott et al. |
| 2008/0018617 A1 | 1/2008 | Ng |
| 2008/0165141 A1 | 7/2008 | Christie |
| 2008/0168403 A1* | 7/2008 | Westerman et al. .......... 715/863 |
| 2008/0246496 A1 | 10/2008 | Hristov et al. |
| 2009/0207138 A1* | 8/2009 | Thorn ........................... 345/173 |
| 2009/0254869 A1* | 10/2009 | Ludwig et al. ................ 715/863 |
| 2010/0079405 A1* | 4/2010 | Bernstein ...................... 345/174 |
| 2010/0097328 A1 | 4/2010 | Simmons et al. |
| 2010/0097329 A1 | 4/2010 | Simmons et al. |
| 2010/0097342 A1 | 4/2010 | Simmons et al. |

FOREIGN PATENT DOCUMENTS

| | | |
|---|---|---|
| WO | WO-00/44018 A1 | 7/2000 |
| WO | WO-2007/037806 A1 | 4/2007 |
| WO | WO-2007/146780 A2 | 12/2007 |

* cited by examiner

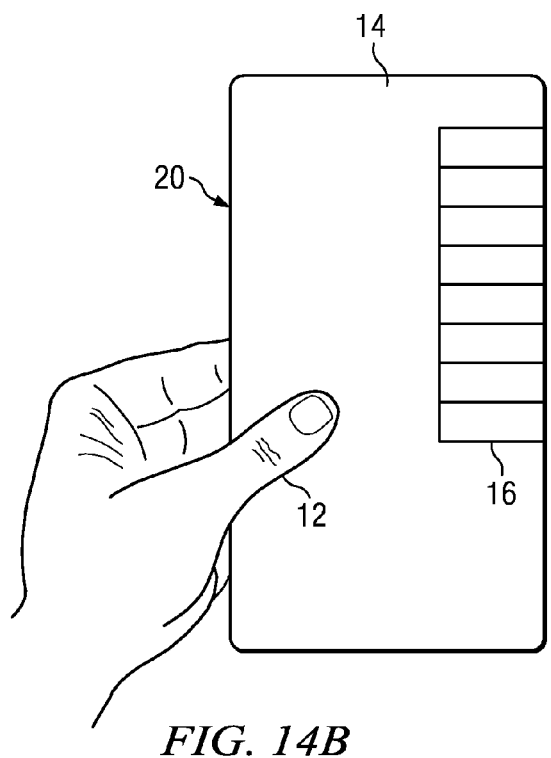
*FIG. 14B*
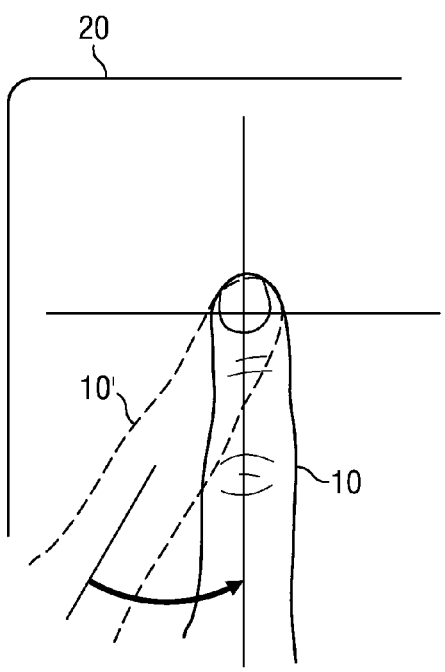 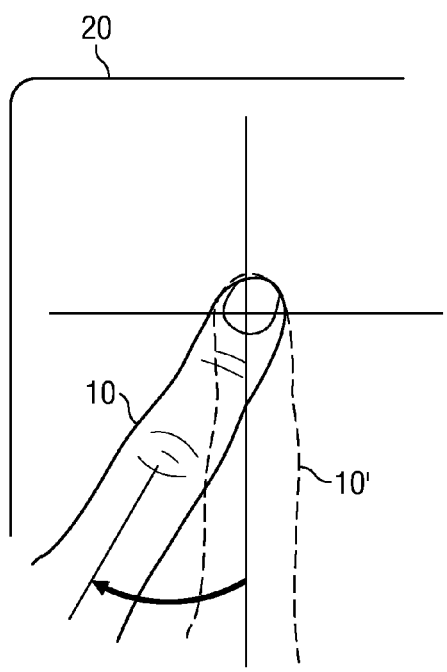
*FIG. 16A*   *FIG. 16B*

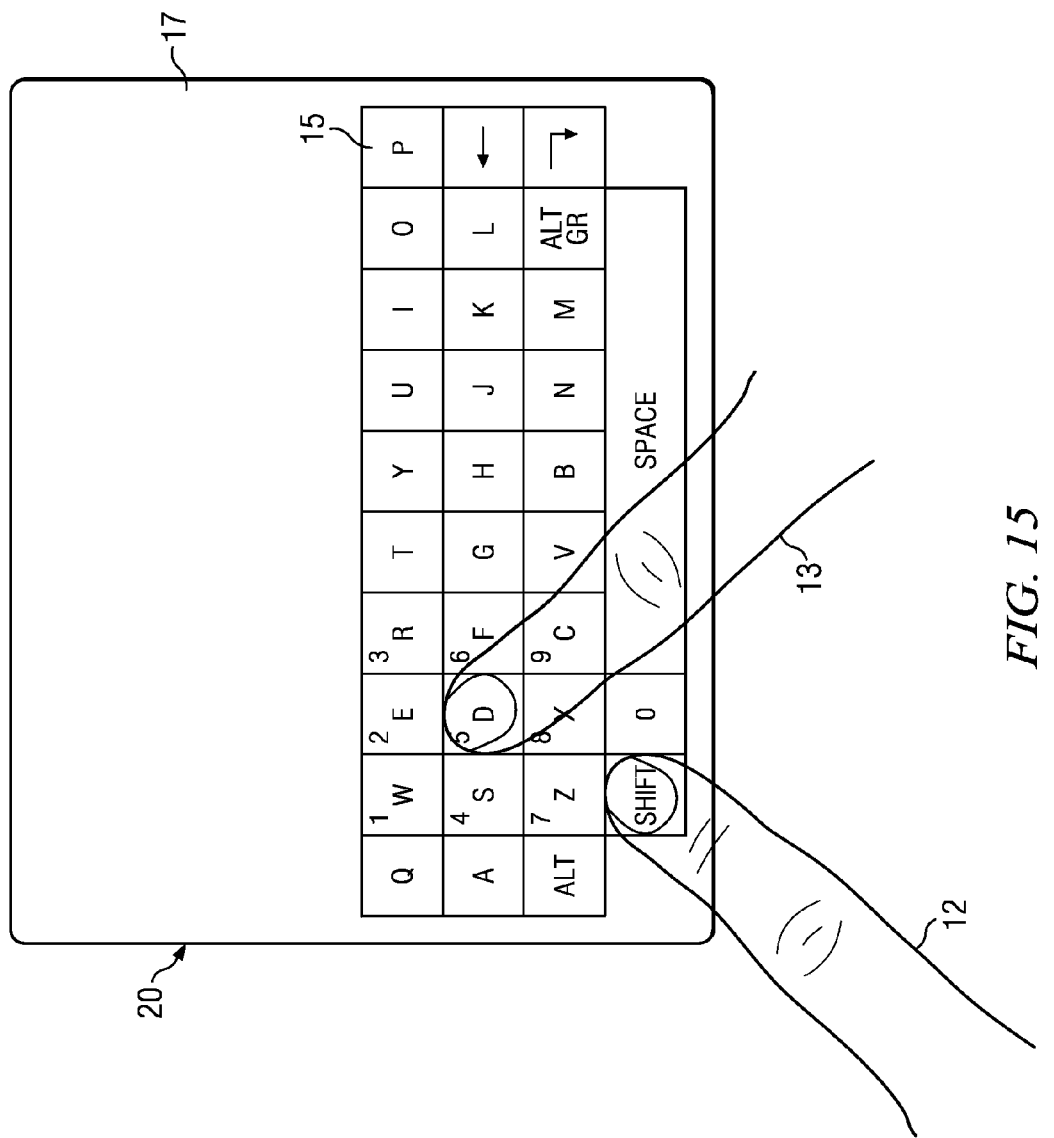

TWO-DIMENSIONAL TOUCH SENSORS

BACKGROUND

The invention relates to two-dimensional (2D) touch sensors, in particular to the processing of data acquired from such sensors.

Various different technologies are used for 2D touch sensors, notably resistive capacitive. Independently of which technology is used, 2D touch sensors generally have a construction based on a matrix of sensor nodes that form a 2D array in Cartesian coordinates, i.e. a grid.

Two of the most active development areas in capacitive touch sensing are the related topics of multi-touch processing and gesture recognition, or "multi-touch" and "gestures" for short.

Multi-touch refers to the ability of a 2D touch sensor to be able to sense more than one touch simultaneously. Basic touch sensors are designed to assume that only one touch is present on the sensor at any one time, and are designed to output only one x,y coordinate at any one time. A multi-touch sensor is designed to be able to detect multiple simultaneous touches. The simplest form of a multi-touch sensor is a two-touch sensor which is designed to be able to detect up to two simultaneous touches.

It will be appreciated that two-touch detection is essential for even basic keyboard emulation, since a SHIFT key is required to operate a conventional keyboard. Further, many gestures require two-touch detection. Although the term "gesture" is perhaps not well defined in the industry, it is generally used to refer to user input that is more sophisticated than a single "tap" or "press" at a particular location. A very simple gesture might be a "double tap" when the user quickly touches and releases the touch surface twice in quick succession. However, usually, when gestures are referred to it is in connection with touch motions. Example single touch motion gestures are "flick" and "drag", and example two-touch motions are "pinch", "stretch" and "rotate".

Clearly, a multi-touch sensing capability is a pre-requisite for being able to provide for any gestures based on two or more simultaneous objects.

Existing approaches to gesture recognition are based on supplying a gesture recognition algorithm with a time series of touch coordinates from the touch sensor, the data set from each time interval being referred to as a frame, or frame data in the following. For example, the outcome of the processing four sequential time frames $t_1$ $t_2$ $t_3$ and $t_4$ to track motion of up to three touches on a touch sensor could be the following data:

TABLE 1

|            | Touches/objects adjacent touch panel | | |
|------------|------|--------|--------|
| Time frame | 1    | 2      | 3      |
| $t_1$      | (4, 7) | (4, 3) | (10, 7) |
| $t_2$      | (3, 7) | (2, 4) | (6, 6) |
| $t_3$      | (1, 8) | (—, —) | (5, 7) |
| $t_4$      | (3, 8) | (—, —) | (6, 7) |

In the table example (x, y) coordinates of three tracked touches are shown, where the second touch ceased at time $t_3$. Of course the time series would continue over a very large number of time increments.

The task of the gesture recognition algorithm is to analyze the frame data: first to identify which gestures are being input by the user; and second to parameterize the recognized gestures and output these parameters to a higher level of the processing software. For example, a gesture recognition algorithm may report that the user has input a "rotate" gesture which expresses a rotation through a 67 degree angle.

SUMMARY

The invention departs from the conventional assumption that the touch sensor provides only touch location data by providing a touch sensor that additional provides data relating to, or derived from, the shape of a touch. This is achieved by having sampling nodes on a finer mesh or grid than the size of the actuating object, typically a finger. Each touch of a finger will therefore generally cause multiple adjacent nodes of the sensor to be activated, so that each touch has a shape formed by a group of nodes. This allows the touch sensor to output a touch location for each touch, although the touch location is not simply synonymous with a single node being in detect, but is computed from analysis of a group of activated nodes that collectively represent the touch, e.g. computed from the centroid of the activated nodes. Furthermore, this additionally allows the touch sensor to output data related to the shape of the touch. In particular, a touch sensor can be provided which outputs a touch angle with each touch location, and optionally also further data representative of the shape of the touch such as how elongate the touch is. If the shape of a touch is approximated to an ellipse, then the ellipse can be used to provide both an angle and an ellipticity. As is known from basic geometry, ellipticity is a parameter that indicates how elongate an ellipse is, i.e. is a kind of "elongatedeness" factor. In a preferred implementation of the invention, each touch is output as a combination of a touch location and a touch vector. Both touch location and touch vector can be expressed as a two-dimensional co-ordinate, which might be Cartesian or polar in form. Cartesian coordinates are preferred, since this conveniently maps to the usual grid form of a conventional 2D sensor array. For example, for each frame of data collected from the sensor array, the sensor outputs an (x, y) coordinate of touch position or location and an (x, y) vector which by definition has a magnitude and a direction, the direction providing the touch angle and the magnitude the ellipticity or "elongatedness" factor of the touch.

By including this additional shape data as part of the frame data, gesture processing is greatly simplified, since it becomes a much simpler processing task to identify gestures. At least equally as important is that the additional shape data opens up endless possibilities for inventing new gestures which would have been impractical or impossible to identify solely on the basis of the touch location data. In addition, as described in detail further below, it has been possible to implement the invention using very simple numerical methods that are amenable to be run on simple hardware platforms such as microcontrollers.

The present invention builds on and/or its best modes incorporate elements from three earlier inventions by Martin Simmons and Daniel Pickett, who are two of the co-inventors of the present application, which are now listed.

U.S. Ser. No. 12/255,610 filed on 21 Oct. 2008 which described a method and apparatus for identifying touches on a 2D touch sensor where the touch size is larger than the node separation.

U.S. Ser. No. 12/255,616 filed on 21 Oct. 2008 which describes a method and apparatus for computing touch locations on a 2D touch sensor where the touch size is larger than the node separation.

U.S. Ser. No. 12/255,620 filed on 21 Oct. 2008 which describes a method and apparatus for tracking multiple touches on a 2D touch sensor.

The contents of these three earlier applications are incorporated herein by reference in their entirety.

The invention provides in one aspect a method of sensing touches on a touch sensor, the method comprising: providing a touch sensor having a two-dimensional array of sensing nodes distributed over a sensing area; acquiring a frame of touch signal values from the sensing nodes; processing the touch signal values to detect at least one touch in the frame, each touch being formed of a contiguous group of one or more sensing nodes; computing for each touch its touch location on the sensing area by processing the touch signal values of the touch; computing for each touch a touch angle indicative of orientation of the touch on the sensing area by processing the touch signal values of the touch; and outputting for each frame frame data including the touch location and the touch angle.

The method may further comprise: computing for each touch a touch ellipticity factor indicative of how elongate a shape is possessed by the touch by processing the touch signal values of the touch; and outputting for each frame as part of the frame data the touch ellipticity factor. The touch location can be translated by a correction distance and in a correction direction determined respectively from the touch ellipticity factor and the touch angle.

In embodiments of the invention, the touch angle and touch ellipticity factor are expressed jointly as a vector. The vector may be expressed as a Cartesian coordinate (x, y), or as a polar coordinate (r, θ).

In one specific implementation, the vector is computed by summing touch signal values along first and second orthogonal pairs of directions, the pairs being rotated by 45 degrees relative to each other, and obtaining a first ratio from the sums for the first pair, and a second ratio from the sums for the second pair. The sums taken to compute the ratios may be the ones with the maximum value in each of the four directions. Alternatively, only one sum need be computed for each direction if the touch location is taken to be the origin and only one line intersecting the origin is taken for each of the four directions.

The term ellipticity is used in a loose sense rather than a strict geometric sense to express the degree of "elongatedness" of the touch, and does not imply that the touch or the shape of the touch is processed in terms of an ellipse shape.

The touch direction is additionally determined from a binary pointing direction indicator which may be predetermined, for example with knowledge of how the device incorporating the touch sensor will be oriented when in normal use. Alternatively, the binary pointing direction indicator can be calculated from properties of the touch being detected.

The method may further comprise: providing a gesture processor arranged to receive the frame data from the touch sensor and operable to process the frame data over time, wherein the gesture processor runs a gesture processing algorithm which identifies gestures from the frame data, and outputs gesture data. The gesture processing algorithm may include recognition for at least one gesture having a parameter with a mapping to the touch angle. The gesture processing algorithm may be operable to determine whether the touch is from a left hand or a right hand based on the touch angle and preferably also the touch ellipticity factor are used to determine whether the touch is from a left hand or a right hand. This may be a finger of the left or right hand, or a stylus held in the left or right hand. This functionality can be provided, since hand-held devices will be held in a certain way when making key entries, so that left-hand and right-hand touches by the fingers and/or thumbs will be within a certain predictable angular range.

The gesture recognition algorithm preferably includes recognition for at least one gesture based on analysis of the touch angle and the touch location over time such that motion of the touch location in a direction generally transverse to the touch angle of the touch is recognized as a lateral sliding or rocking motion of a finger.

The gesture processing algorithm preferably includes recognition for at least one gesture having a parameter with a mapping to the touch ellipticity factor.

The gesture recognition algorithm preferably includes recognition for at least one gesture which jointly processes the touch angle and touch ellipticity factor, using the magnitude of the touch ellipticity factor to determine angular precision of the touch angle.

The gesture processing algorithm may be operable to determine whether the touch is from a thumb or a finger based on the touch ellipticity factor and optionally also the touch angle. Generally thumb touches are rounder and finger touches more elongate, so thumb touches will have lower ellipticity. This may be useful in a two-touch gesture of thumb and forefinger. For example, the thumb can be defined as the origin for rotation or other motion by the forefinger.

The parameter mapped to the touch angle could be rotation (e.g. of an object within a scene or of a whole scene), zoom in or zoom out of a view (e.g. zoom in/out mapped to positive/negative angular progression over time or vice versa), direction of travel (e.g. in a street view), actuation of a steering wheel (e.g. in a car driving simulation), for example.

The gesture recognition algorithm may include recognition for at least one gesture based on analysis of the touch ellipticity factor and touch location over time such that change in the touch ellipticity factor while the touch location is relatively constant is recognized as a vertical rocking motion of a finger in which the angle of the finger to the plane of the sensing area is being varied.

The touch sensor can be a capacitive touch sensor or some other type of touch sensor. In the following detailed description, capacitive sensing examples will be used, but the skilled person will understand that the method of the invention is applicable to any 2D position sensing technology that outputs raw data sets from its sensing surface of the kind described herein, for example resistive, total internal reflection, ultrasonic, surface acoustic wave and other devices.

The invention in another aspect provides a touch sensor, comprising: a two-dimensional array of sensing nodes distributed over a sensing area; a measurement circuit operable to acquire frames of touch signal values from the sensing nodes; and a processing unit operable to: process the touch signal values to detect at least one touch in the frame, each touch being formed of a contiguous group of one or more sensing nodes; compute for each touch its touch location on the sensing area by processing the touch signal values of the touch; compute for each touch a touch angle indicative of orientation of the touch on the sensing area by processing the touch signal values of the touch; and output for each frame frame data including the touch location and the touch angle. The processing unit is preferably further operable to: compute for each touch a touch ellipticity factor indicative of how elongate a shape is possessed by the touch by processing the touch signal values of the touch; and output for each frame as part of the frame data the touch ellipticity factor.

The touch sensor may be provided in combination with a gesture processor arranged to receive the frame data from the touch sensor and operable to process the frame data over time, wherein the gesture processor is operable to run a gesture processing algorithm to identify gestures from the frame data, and output gesture data.

Using a touch sensor with independently addressable sensing "nodes" on a finer grid than the size of a touch pad of a touching finger, for example a grid spacing of less than around 5 mm, it is possible to resolve the "shape" of a touching object. Using suitable algorithms it is possible to deduce the angle of the touching object relative to the sensing grid and also its degree of "elongatedness". By reporting this angle data alongside the touch position data a new class of gestures can be provided, both one touch and multi-touch. For example, with a single finger it is possible to have a zoom-in and zoom-out gesture by simply twisting a touching finger on the touch screen. Using two fingers with a twisting motion can also be used for other user interface control. The angle and elongatedness factor can be exploited on a per-touch basis, e.g. independently for each touch in a multi-touch acquisition. It is also possible to use the angle of touch to correct for systematic human error in actuating virtual keys or icons.

BRIEF DESCRIPTION OF THE DRAWINGS

For a better understanding of the invention, and to show how the same may be carried into effect, reference is now made by way of example to the accompanying drawings.

FIGS. 14A and 14B illustrate a user holding a hand-held device with a touch sensitive display panel with his right and left hands respectively to illustrate an application example of the shape data.

FIG. 15 illustrates a hand-held device with a QWERTY keyboard being actuated by two-thumbs to illustrate an application example of the shape data.

FIGS. 16A and 16B show a single finger being rotated between two positions to illustrate an application example of the shape data.

DETAILED DESCRIPTION

Figure 1:
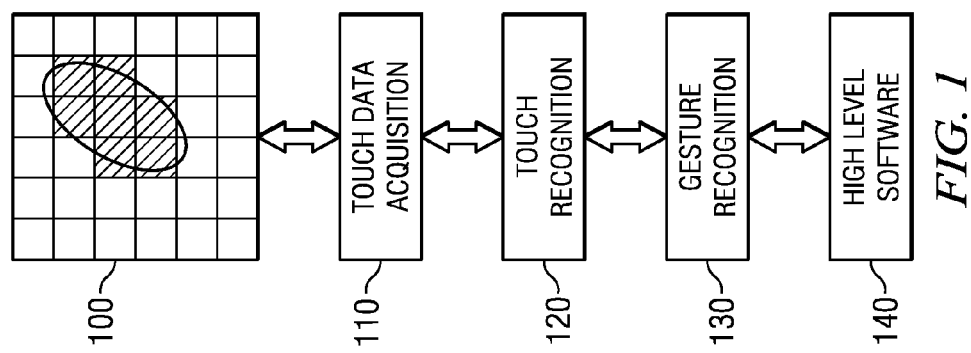
FIG. 1 is a schematic diagram of an embodiment of the invention.

FIG. 1 is a schematic diagram showing a touch sensor 100 registering a finger touch illustrated with a dotted ellipse.

The touch sensor 100 comprises a two-dimensional array of sensing nodes distributed over a sensing area in combination with associated measurement circuitry. In use, each node or key delivers a measurement signal indicative of proximity of a touch. A set of data from the sensor comprising a measurement signal value from each key is referred to as a frame of data. In the figure, a 6×6 array of keys is shown, with the touch causing a contiguous group of 7 nodes to register proximity of the touching object. These keys, which are referred to as keys "in detect", typically since their measurement signal is above a threshold, are shaded in the figure.

The touch sensor 100 is connected to a touch data acquisition unit 110 which is operable to acquire frames of data from the sensing nodes.

The touch data acquisition unit 110 outputs the frame data to a touch recognition unit 120 which is operable to process the touch signal values to detect if there are any touches in the frame. In a simple implementation, the touch recognition unit is only capable of distinguishing one touch in any frame, but in general the touch recognition unit preferably has the capability of being able to detect two simultaneous touches, three simultaneous touches or more. Each touch is formed of a contiguous group of one or more sensing nodes. Each touch is further processed to compute its touch location on the sensing area, i.e. its x and y coordinates. This is achieved by processing the touch signal values of the touch. Each touch is also processed to compute shape data, in particular a touch angle indicative of orientation of the touch on the sensing area and a touch ellipticity factor indicative of how elongate a shape is possessed by the touch by processing the touch signal values of the touch. In the preferred embodiment both shape parameters are conveyed in the form of a vector, the direction of which provides the angle and the magnitude of which provides the ellipticity. The vector can be conveniently conveyed as an x, y coordinate pair, so that the position and shape data for each frame are collectively output as two x, y coordinate pairs.

The touch position and shape data are output from the touch recognition unit 120 to a gesture recognition processor 130. The gesture recognition processor 130 is operable to run a gesture processing algorithm which identifies gestures from the touch position and shape data.

The gesture recognition processor 130 has an output connected to a higher level software processing unit 140 which is programmed to act on gesture data. The gesture recognition processor 130 operates to output gesture data to indicate which gestures are identified together with their parameter values, such as a rotate through a certain angle, or a double tap with a measured time interval between the taps.

Figure 2:
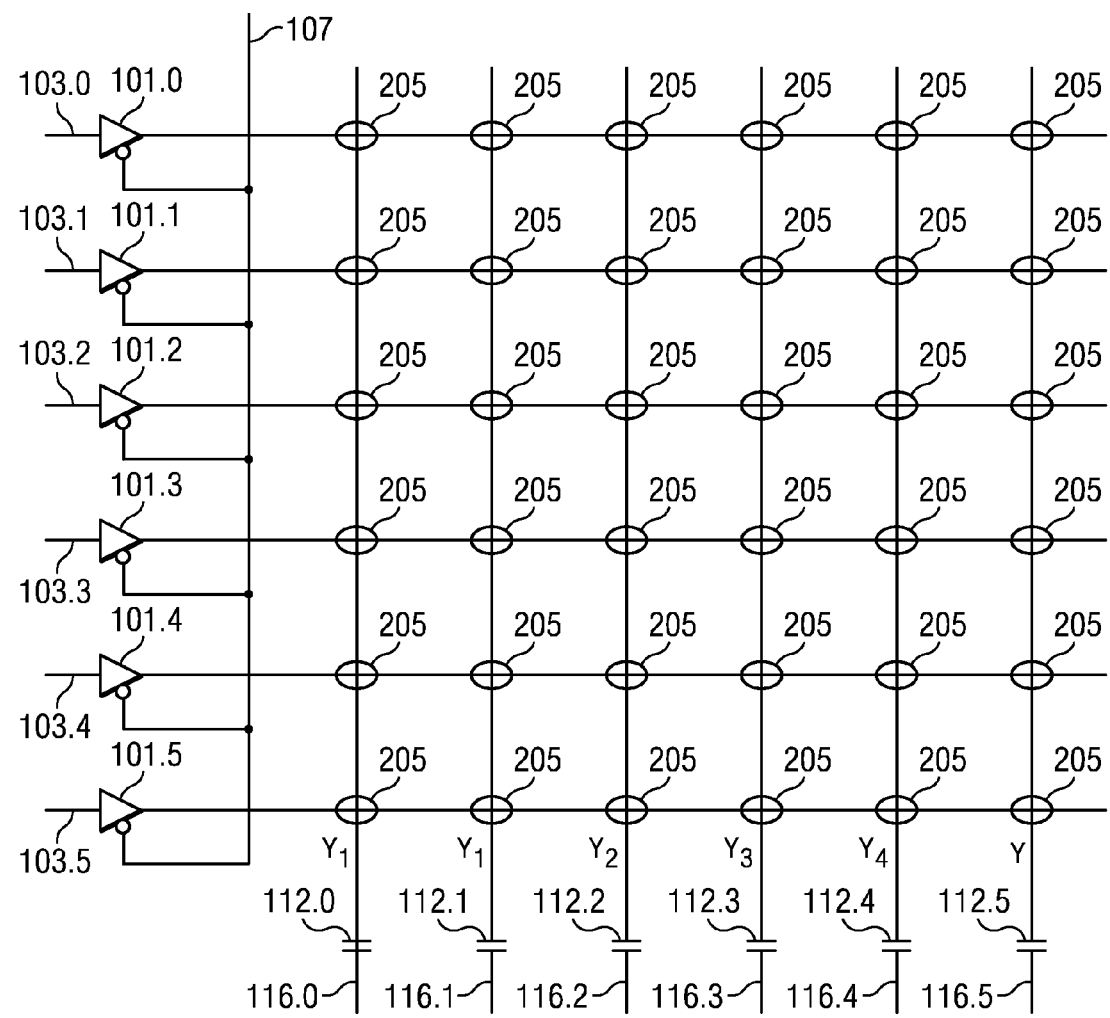
FIG. 2 schematically shows in plan view circuit elements of a 2D touch-sensitive capacitive position sensor.

FIG. 2 illustrates the touch sensor 100 and how it is connected to the touch data acquisition unit 110 in more detail. A touch sensitive matrix is shown that provides a two-dimensional capacitive transducing sensor arrangement. The touch sensor 100 comprises an m×n array of m row electrodes and n column electrodes, where m=n=6. It will be appreciated that the number of columns and rows may be chosen as desired, another example being twelve columns and eight rows or any other practical number of columns and rows.

The array of sensing nodes is accommodated in or under a substrate, such as a glass panel, by extending suitably shaped and dimensioned electrodes. The sensing electrodes define a sensing area within which the position of an object (e.g. a finger or stylus) to the sensor may be determined. For applications in which the sensor overlies a display, such as a liquid crystal display (LCD), the substrate may be of a transparent plastic material and the electrodes are formed from a transparent film of Indium Tin Oxide (ITO) deposited on the substrate using conventional techniques. Thus the sensing area of the sensor is transparent and can be placed over a display screen without obscuring what is displayed behind the sensing area. In other examples the position sensor may not be intended to be located over a display and may not be transparent; in these instances the ITO layer may be replaced with a more economical material such as a copper laminate Printed Circuit Board (PCB), for example.

There is considerable design freedom in respect of the pattern of the sensing electrodes on the substrate. All that is important is that they divide the sensing area into an array (grid) of sensing cells arranged into rows and columns. (It is noted that the terms "row" and "column" are used here to conveniently distinguish between two directions and should not be interpreted to imply either a vertical or a horizontal orientation.) Some example electrode patterns are disclosed in US 2008/0246496A1 for example, the contents of which are incorporated in their entirety.

It will be recognized by the skilled reader that the sensor illustrated is of the active type, i.e. based on measuring the capacitive coupling between two electrodes (rather than between a single sensing electrode and a system ground). The principles underlying active capacitive sensing techniques are described in U.S. Pat. No. 6,452,514. In an active-type sensor, one electrode, the so called drive electrode, is supplied with an oscillating drive signal. The degree of capacitive coupling of the drive signal to the sense electrode is determined by measuring the amount of charge transferred to the sense electrode by the oscillating drive signal. The amount of charge transferred, i.e. the strength of the signal seen at the sense electrode, is a measure of the capacitive coupling between the electrodes. When there is no pointing object near to the electrodes, the measured signal on the sense electrode has a background or quiescent value. However, when a pointing object, e.g. a user's finger, approaches the electrodes (or more particularly approaches near to the region separating the electrodes), the pointing object acts as a virtual ground and sinks some of the drive signal (charge) from the drive electrode. This acts to reduce the strength of the component of the drive signal coupled to the sense electrode. Thus a decrease in measured signal on the sense electrode is taken to indicate the presence of a pointing object.

The illustrated m×n array is a 6×6 array comprising 6 drive lines, referred to as X lines in the following, and six sense lines, referred to as Y lines in the following. Where the X and Y lines cross-over in the illustration there is a sensing node 205. In reality the X and Y lines are on different layers of the touch panel separated by a dielectric, so that they are capacitively coupled, i.e. not in ohmic contact. At each node 205, a capacitance is formed between adjacent portions of the X and Y lines, this capacitance usually being referred to as $C_E$ or $C_X$ in the art, effectively being a coupling capacitor. The presence of an actuating body, such as a finger or stylus, has the effect of introducing shunting capacitances which are then grounded via the body by an equivalent grounding capacitor to ground or earth. Thus the presence of the body affects the amount of charge transferred from the Y side of the coupling capacitor and therefore provides a way of detecting the presence of the body. This is because the capacitance between the X and Y "plates" of each sensing node reduces as the grounding capacitances caused by a touch increase. This is well known in the art.

In use, each of the X lines is driven in turn to acquire a full frame of data from the sensor array. To do this, the touch data acquisition unit 110 actuates the drive circuits 101.$m$ via control lines 103.$m$ to drive each of the 'm' X lines in turn. A further control line 107 to the drive circuits provides an output enable to float the output to the X plate of the relevant X line.

For each X line, charge is transferred to a respective charge measurement capacitor Cs 112.$n$ connected to respective ones of the 'n' Y lines. The transfer of charge from the coupling capacitors 205 to the charge measurement capacitors Cs takes place under the action of switches that are controlled by the controller. For simplicity neither the switches or their control lines are illustrated. Further details can be found in U.S. Pat. No. 6,452,514 and WO-00/44018.

The charge held on the charge measurement capacitor Cs 112.$n$ is measurable by the touch data acquisition unit 110 via respective connection lines 116.$n$ through an analog to digital converter (not shown).

More details for the operation of such a matrix circuit are disclosed in U.S. Pat. No. 6,452,514 and WO-00/44018.

The touch data acquisition unit 110 operates as explained above to detect the presence of an object above one of the matrix of keys 205, from a change in the capacitance of the keys, through a change in an amount of charge induced on the key during a burst of measurement cycles. However, the presence of a noise signal can induce charge onto the keys of a touch sensor and provide a false detection or prevent a detection being made.

The touch data acquisition unit 110 is operable to compute the number of simultaneous touches on the position sensor and to assign the discrete keys to one of the simultaneous touches using the algorithm described below. The discrete keys assigned to each of the touches are output from the controller to a higher level system component on an output connection. Alternatively, the touch data acquisition unit 110 will interpolate each of the nodes assigned to each of the touches to obtain the coordinates of the touch. The numerical approach used to interpolate the touch coordinates may be to perform a centre of mass calculation on the signals from all nodes that are assigned to each touch, similar to that disclosed in US 2006/0097991.

Figure 3:
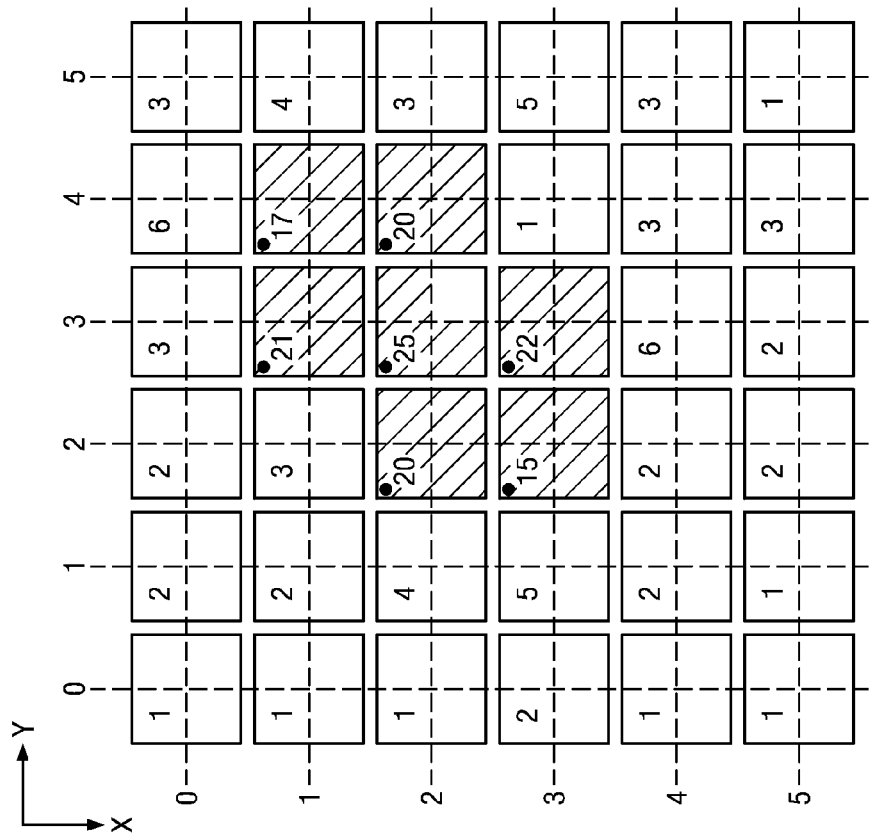
FIG. 3 illustrates an example output data set from a 2D touch sensor for a single touch.

FIG. 3 shows a typical plot of data from a 2D touch panel that could be output from the touch data acquisition unit 110.

The plot shows the signal level at each of the discrete keys or nodes which are located at the intersection of the x- and y-conducting lines at every intersection of the x and y conducting lines. For the purposes of the foregoing the intersections at each of the x and y conducting wires will be referred to as nodes.

The signal data are shown as a two dimensional layout in nominal plan view of the touch panel. The numbers in each of the squares represent the signal values at each intersection of the x and y conducting lines or wires, i.e. at each sensing node. In addition, circles in the top left corner of each node area denote that the relevant node is "in detect", i.e. has an above-threshold signal value, where the threshold is 12 in these examples, 13 being in detect and 12 being out of detect. The in detect nodes are also shaded with oblique hatching. It is noted that the frame data corresponds to the example touch illustrated highly schematically in FIG. 1. The x and y conducting lines are indicated by the vertical and horizontal dotted lines respectively. There are six x-electrodes labeled 0-5 and eight y-electrodes labeled 0-5.

Figure 4:
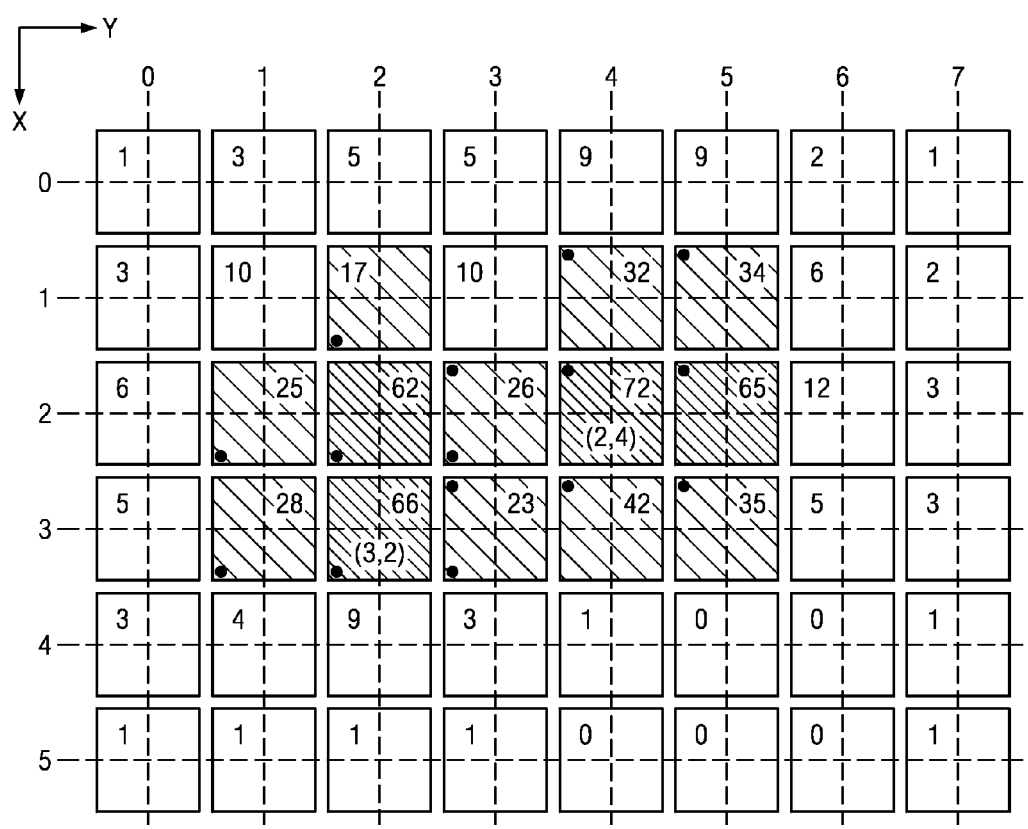
FIG. 4 illustrates an example output data set from the 2D touch sensor of FIG. 3 with two touches.

FIG. 4 shows another example, but with two simultaneous touches. The signal values are indicated, and in detect nodes shaded, as before. In addition, the convention of placing circles in the corner of in detect nodes is extended, whereby in detect nodes associated with a first touch have circles in the top left corner as before, and those of the second touch have circles placed in the bottom left corner. As can be seen, two of the nodes—the ones at (3, 2) and (3, 3)—are shared, i.e. are part of both touches. The nodes of each touch with the largest signal value are also labeled with their coordinates.

Figure 5:
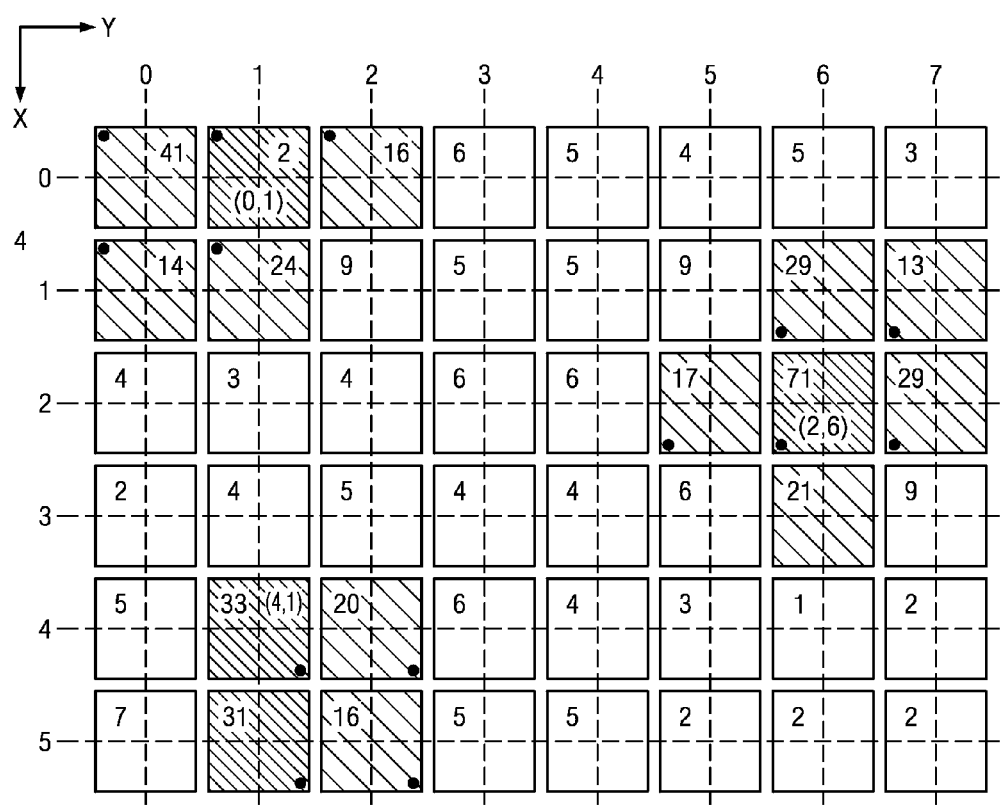
FIG. 5 illustrates an example output data set from the 2D touch sensor of FIG. 3 with three touches.

FIG. 5 show a further example touch data with 3 simultaneous touches. The same labeling conventions are used as before. In addition, the convention of placing circles in the corner of in detect nodes is extended so the first, second and third touches are indicated with circles in the top left, bottom left and bottom right corners respectively.

Figure 6:
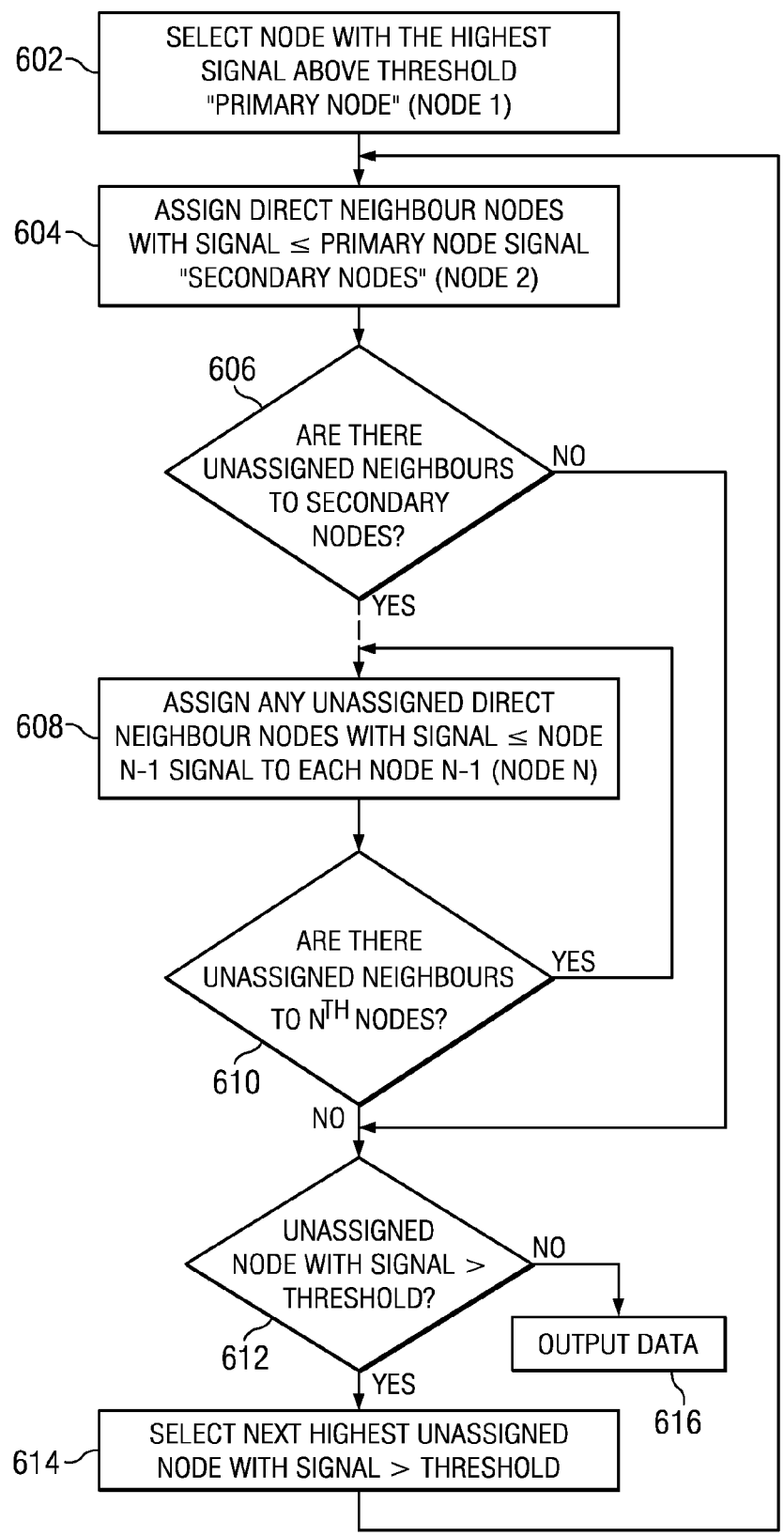
FIG. 6 is a flow diagram showing the method for assigning nodes to a one or more touches adjacent a touch panel.

FIG. 6 shows a flow chart of the method used to assign discrete keys or nodes to one or more touches located on a touch panel. The flow chart shown in FIG. 6 will be used in conjunction with FIGS. 3, 4 and 5 to illustrate how the signal values of each of the nodes are used to identify which of the nodes are assigned to one or more touches.

In a pre-processing step not shown in the flow chart in FIG. 6, the signal of each of the nodes is compared to a threshold signal value. Any node that has a signal value that is less then the threshold value will not be considered in the following algorithm. This is the preferred method of the invention. Alternatively the comparison to a threshold could be carried out during the algorithm. In the alternative method, before the node is assigned to a particular touch it is compared to a threshold signal level. Using either method, if the signal value is less than the threshold signal value the node will be as assigned to a null touch. A "null touch" is taken to mean no touch, such that the node will not be considered in any subsequent steps of the algorithm, since it is assigned.

For the purposes of the following description it will be assumed that the signals are compared to a threshold before applying the algorithm. The threshold is taken to be 13. Therefore, each of the node signals shown in FIG. 3 are compared to the threshold of 13 and those that are greater than or equal to the threshold are shaded. The other detected nodes with signals less than the threshold are assigned to a null touch.

In step 602, the node with the highest signal that is not assigned to a touch is selected. In FIG. 3 the node with the highest signal is located at coordinate (2, 3). The first selected node is referred to as the primary or start node.

In step 604, the signals of each of the direct neighbors to the selected node at coordinate (2, 3), that are not already assigned, are compared to the signal of the selected node or the primary node. In the example shown in FIG. 3, there are 8 direct neighbor nodes. If the signal of the direct neighbor node is less than or equal to the selected node's (primary node) signal, then the direct neighboring node is assigned to the selected node or primary node. This is interpreted to mean that nodes that are assigned to another node form a single touch. In the example shown in FIG. 3 the nodes at coordinates (1, 3), (1, 4), (2, 2), (2, 4), (3, 2) and (3, 3) are all assigned to the selected or primary node at coordinate (2, 3). These are referred to as secondary nodes. All of the other neighboring nodes are already assigned to a null touch in the pre-processing step described above.

In step 606, the assigned status of each of the direct neighbors of each of the secondary nodes is identified. Each of the secondary nodes are now starting nodes. If there are no unassigned direct neighbor nodes to any of the secondary nodes, then the process goes to step 612. In the example shown in FIG. 3 all the neighbor nodes of the secondary nodes are either assigned to the primary node or a null touch. Therefore, for the example shown in FIG. 3 the process goes to step 612. However, if there are unassigned direct neighbor nodes to any of the secondary nodes, the signals of each of these are compared to the signal values of the secondary node that they are direct neighbors with. This process is repeated for each of the secondary nodes, until there are no more unassigned nodes that are direct neighbors to the each of the secondary nodes. If any of the direct neighbor nodes have a signal less than or equal to the signal of the secondary node, the node is assigned to the same touch. These nodes are referred to as tertiary nodes. The process shown in steps 608 and 610 are repeated through quaternary, quinary and so forth starting nodes until there are no unassigned nodes that fulfill the requirement of having a signal value less than or equal to the signal value of its direct neighbor starting node. In other words the steps 608 and 610 are repeated until there are no longer any new assigned starting nodes.

In step 612, the nodes are searched for any unassigned nodes having a signal greater than or equal to the threshold.

In step 614, the highest unassigned node is selected and the process in steps 604 to 612 is repeated.

In step 616, the data is output in the form of one or more contiguous groups of nodes assigned to each touch. In the example shown in FIG. 3, there is a single touch. Therefore, the nodes identified above are form a single touch, that is output in the form of one contiguous group of nodes assigned to touch T1, as shown in Table 1.

TABLE 1

| Touch | Node coordinates | |
|---|---|---|
| | Primary | Secondary |
| T1 | (3, 4) | (1, 3), (1, 4), (2, 2), (2, 4), (3, 2), (3, 3) |

FIG. 4 will be used in conjunction with the algorithm shown in FIG. 6, to show how nodes on a touch panel are assigned to multiple touches. It is noted that the array size of 6×8 is different from the previous example, but this does not affect any of the principles of operation. There are six x-electrodes labeled 0-5 and eight y-electrodes labeled 0-7, the orientation of which are shown towards the top left of the drawing in FIG. 4. The pre-processing step is applied to each of the nodes shown in FIG. 4. The signal from each of the nodes is compared to a threshold of 13. The nodes having a signal value greater than or equal to 13 are shaded. All the other nodes are assigned to a null touch.

The signal values of the unassigned nodes are searched for the node with the highest signal value. The unassigned node with the highest signal value is the node at coordinate (2, 4) with a signal value of 72. This is the primary or stating node for this touch. The touch whose starting node is at coordinate (2, 4) will be referred to as T1.

The signal value of each of the unassigned nodes that are direct neighbors of the primary node of T1, are compared to the signal value of the primary node. Nodes at coordinates (1, 4), (1, 5), (2, 3), (2, 5), (3, 3), (3, 4) and (3, 5) all have signal values that are less then or equal to the signal value of the primary node. Therefore, nodes at coordinates (1, 4), (1, 5), (2, 3), (2, 5), (3, 3), (3, 4) and (3, 5), referred to as secondary nodes, are assigned to the primary nodes and thus to the touch T1.

The process is now repeated for each of the secondary nodes. In FIG. 4 secondary nodes at coordinates (2, 3) and (3, 3) are the only nodes that have direct neighbor nodes that are unassigned. Taking the node at coordinate (2, 3), the signal value of each its direct neighbor nodes that are unassigned is compared to the signal value of the secondary node at coordinate (2, 3). The unassigned direct neighbor to the node at coordinated (2, 3) are the nodes at coordinates (2, 2) and (3, 2). However, the signal values of both of these nodes are greater than signal value of the node at coordinate (2, 3). Therefore, neither of these nodes are assigned to the secondary node (2, 3) or touch T1. None of the other secondary nodes have direct neighbor nodes that are not already assigned or that have signals that are less than or equal to the signal value of any of the secondary nodes. Therefore, any unassigned nodes that have a signal value greater than or equal to the threshold signal value are identified.

The nodes at coordinate (3, 2) is identified as a starting or primary node for touch T2. The process described above is repeated with the unassigned nodes for touch T2. Using the process described above nodes at coordinates (1, 2), (2, 1), (2, 2), (2, 3), (3, 1) and (3, 3) are all assigned to the primary node at coordinate (3, 2) and thus touch T2. These are also known as secondary nodes. There are no other unassigned touches on the touch panel shown in FIG. 4. Table 2 below summarizes the nodes that are assigned to each of the touches T1 and T2. The data shown in Table 2 is output in the form of two contiguous groups of nodes assigned to each touch.

TABLE 2

| Touch | Node coordinates | |
|---|---|---|
| | Primary | Secondary |
| T1 | (2, 4) | (1, 4), (1, 5), (2, 3), (2, 5), (3, 2), (3, 3), (3, 4) |
| T2 | (3, 2) | (1, 2), (2, 1), (2, 2), (2, 3), (3, 1), (3, 3) |

FIG. 5 shows the signal data from FIG. 5 as a two dimensional layout the same as that of FIG. 4. The pre-processing step is applied to each of the nodes shown in FIG. 5. The signal from each of the nodes is compared to a threshold of 13. The nodes having a signal value greater than or equal to 13 are shaded. All the other nodes are assigned to a null touch.

The process described above is applied to the nodes shown in FIG. 5. Table 3 below summarizes the coordinates that are assigned to three touches T1, T2 and T3.

TABLE 3

| Touch | Node coordinates | |
|---|---|---|
| | Primary | Secondary |
| T1 | (2, 6) | (1, 6), (1, 7), (2, 5), (2, 7), (3, 6) |
| T2 | (0, 1) | (0, 0), (1, 0), (1, 1) |
| T3 | (4, 1) | (4, 2), (5, 1), (5, 2) |

The contiguous groups of nodes from Tables 1, 2 or 3 is output from the touch data acquisition unit 110 to the touch recognition unit 120 for further processing.

The number of touches being sought using the process described above may be capped to a maximum, for example limited to 1, 2, 3 or 4. For example, if none of the higher level processing for gesture detection or other tasks cater for more than, for example, 3 or 4 simultaneous touches, there is no benefit in repeating the method of the invention beyond the fourth touch, since this would be wasted processing. Moreover, the data collection mode can be flexibly varied by varying the fixed number depending on what application, or what part of an application, is being run on the device to which the touch screen provides input. Namely, some applications will only need single touch inputs, whereas others will expect multitouch inputs, often with a fixed maximum number of simultaneous touches.

To summarize this part of the processing, the output is, for each frame, data indicating which, if any, touches have been registered, and which nodes they involve.

For each touch it is then necessary to compute the deemed location of the touch. This is now described with reference to FIGS. 6, 7 and 8 using values from the example touch of FIG. 3. The method computes touch location as an x, y coordinate from a touch made up of arbitrary numbers of nodes.

Figure 7:
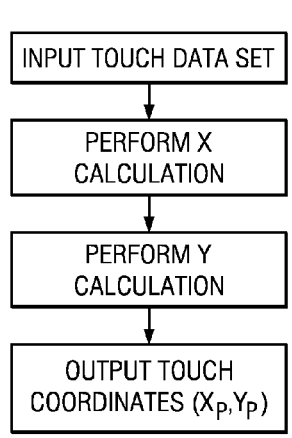
FIG. 7 is a flow diagram showing a method for calculation of touch location.

FIG. 7 is a flow diagram showing a method for calculation of touch location. The method starts with input of a touch data set. The flow then progresses to respective steps of computing the x and y coordinates of the touch. Finally, these coordinates are output for use by higher level processing.

Figure 8:
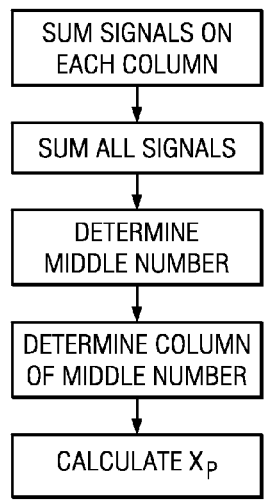
FIG. 8 is a flow diagram showing computation of the x coordinate in the process of FIG. 7.

FIG. 8 is a flow diagram showing computation of the x coordinate. The steps shown in the flow diagram in FIG. 8 are now used in conjunction with the frame data set shown in FIG. 3 with only the above-threshold signals being considered.

The signals in each of the columns are summed. Using the output data set from FIG. 3, the three columns are summed to 35, 68 and 37 respectively, going from left to right in columns 2, 3 and 4.

Each of the column sums are summed together. Using the output data set from FIG. 3 the summed columns from above are summed, i.e. 35+68+37=140.

The median position of the sum of all signals is found. Using the output data set from FIG. 3 the median position is 70.

The column containing the median position is identified by counting up from 1 starting at the far left of the output data set. Using the output data set from FIG. 3, the output data set is counted as follows:
Column 2 counts from 1 to 35
Column 3 counts from 36 to 1028
Column 4 counts from 103 to 140

Therefore the median position of 70 is in Column 3. This is interpreted as the x coordinate lies in the 4th column, or at a coordinate between 2.5 and 3.5.

To calculate where the x coordinate lies between 2.5 and 3.5, the median position and the summed column value of the median column are used. The summed column signals to the left of the median column are summed and subtracted from the median position. This is calculated using the data set shown in FIG. 3 and the median position calculated above to be 70−35=35. This result is then divided by the summed signal value of the median column calculated above i.e. 35/68=0.51. The result of this is then summed with 2.5, which is the x coordinate at the left edge of the median column. Therefore, the x coordinate is calculated to be 3.01.

In the above method for calculating the x coordinate the median of the total summed signal values is used. However, if the median lies between two of the columns, at 1.5 for example, then the mean could be used or either column could be arbitrarily chosen.

Figure 9:
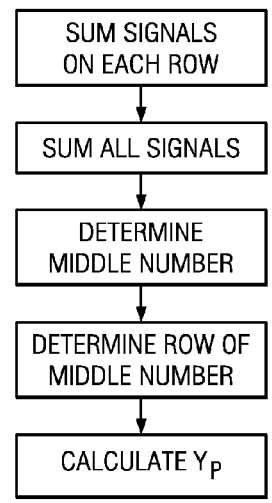
FIG. 9 is a flow diagram showing computation of the y coordinate in the process of FIG. 7.

FIG. 9 is a flow diagram showing computation of the y coordinate. The steps shown in the flow diagram in FIG. 9 are now used in conjunction with the output data set shown in FIG. 3.

The signals in each of the rows are summed. Using the output data set from FIG. 3, the three rows are summed to 38, 65 and 37 respectively, going from top to bottom.

Each of the row sums are summed together. Using the output data set from FIG. 3 the summed rows from above are summed, i.e. 38+65+37=140. It is noted that the result from this step is the same as the result obtained when summing the column sums.

The median of the sum of all signals is found. Using the output data set from FIG. 3 the median position is 70. It is noted that the result from this step is the same as the result obtained when finding the median of the summed column sums.

The row containing the median position is identified by counting up from 1 starting at the top of the output data set. Using the output data set from FIG. 3, the output data set is counted as follows:

Row 1 counts from 1 to 38
Row 2 counts from 39 to 102
Row 3 counts from 103 to 140

Therefore the median position of 70 is in Row 2. This is interpreted as the y coordinate lies in the second row, or at a coordinate between 1.5 and 2.5.

To calculate where the y coordinate lies between 1.5 and 2.5, the median position and the summed row value of the median row are used. The summed row signals above the median row are summed and subtracted from the median position. This is calculated using the data set shown in FIG. 3 and the median position calculated above to 70−38=32. This result is then divided by the summed signal value of the median row, calculated above i.e. 32/65=0.49. The result of this is then summed with 1.5, which is the y coordinate at the upper edge of the median row. Therefore, the y coordinate is calculated to be 1.99.

The coordinate of a touch adjacent the touch panel shown in FIG. 3, with signal values shown on FIG. 3 has been calculated to be:

$$(x_p, y_p) = (3.01, 1.99)$$

where the subscript 'p' denotes position to distinguish this coordinate from the later coordinate computed as a touch shape parameter.

The above described approach therefore calculating touch position from a touch containing an arbitrary number of nodes each providing a signal value. This is achieved by obtaining the touch location in each dimension from the node at which the sum of the signal values assigned to the touch on either side of said node are equal or approximately equal. Each of the sensing nodes is replaced by a plurality of notional sensing nodes distributed around its respective sensing node over a distance corresponding to an internode spacing. The touch coordinate is then determined by finding the position of the median node. To avoid having to calculate the mean between two positions in the case of even numbers of notional sensing nodes, an arbitrary one of the two, e.g. the leftmost, can be taken. This is a numerically very simple method for obtaining an x- or y-coordinate at far higher resolution than the resolution of the column and row electrodes without resorting to more involved algebra, such as would be necessary with a centre of mass calculation.

Other methods may also be used for calculating touch position from a touch containing an arbitrary number of nodes each providing a signal value, for example other methods described in U.S. Ser. No. 12/255,616 or standard centre of mass calculations.

In this embodiment, shape data for the touch is conveyed in the form of a vector, and the vector is expressed as x- and y-coordinates denoted ($x_s$, $y_s$) to distinguish from the location or position data ($x_p$, $y_p$).

FIG. 10 once again reproduces the example frame illustrated in FIG. 3 but in addition carries annotations relevant for the touch vector computation. The touch vector is calculated by comparing the aspect ratios of the shape of the touch in orthogonal directions X and Y, and then also for a set of orthogonal axes rotated through 45 degrees which we denote XX and YY. These two aspect ratios provide the shape vector coordinates ($x_s$, $y_s$).

Figure 11:
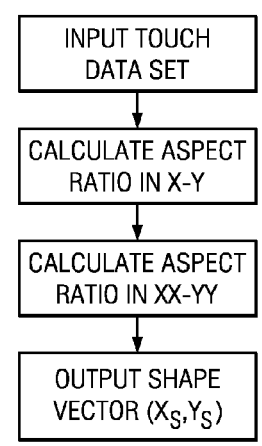
FIG. 11 is a flow diagram showing a method for calculation of a touch shape vector.

FIG. 11 is a basic flow diagram showing the steps that are followed to calculate the shape vector coordinate.

The touch data set is first input.

The parameters in X and Y are calculated as follows. For X, the above-threshold signal values in each row are summed, and then the maximum of those sums taken forward. The maximum X sum in this example is 65. For Y, the above-threshold signal values in each column are summed, and then the maximum of those sums taken forward. The maximum Y sum in this example is 68. The X-Y aspect ratio is therefore 65:68.

The parameters in the rotated axes XX and YY are calculated as follows. For XX, the above-threshold signal values in each North-West to South-East (NW-SE) diagonal are summed, and then the maximum of those sums taken forward. The maximum XX sum in this example is 42. For YY, the above-threshold signal values in each North-East to South-West (NE-SW) diagonal are summed, and then the maximum of those sums taken forward. The maximum YY sum in this example is 57. The XX-YY aspect ratio is therefore 42:57.

The coordinate '$x_s$', is then calculated by taking the X-Y aspect ratio forced to be greater than unity by dividing the larger of the two maxima by the smaller one and subtracting one, and then optionally inserting a negative sign depending on whether the maximum sum in X is greater than or less than the maximum sum in Y.

In the present example, $x_s = -(68/65-1) = -0.05$ with the minus sign being inserted since max. sum X<max. sum Y.

The coordinate '$y_s$' is then calculated by taking the XX-YY aspect ratio forced to be greater than unity by dividing the larger of the two maxima by the smaller one and subtracting one, and then optionally inserting a negative sign depending on whether the maximum sum in XX is greater than or less than the maximum sum in YY.

In the present example, $y_s = -(57/42-1) = -0.36$ with the minus sign being inserted since max. sum XX<max. sum YY.

The shape vector coordinates ($x_s$, $y_s$) are then output together with the position coordinates ($x_p$, $y_p$).

In particular it will be understood that although calculation of the position coordinate and the shape coordinate have been described separately, they will in practice be calculated together in most cases, so the flow diagrams of FIGS. 7 and 11 will be consolidated.

Figure 10:
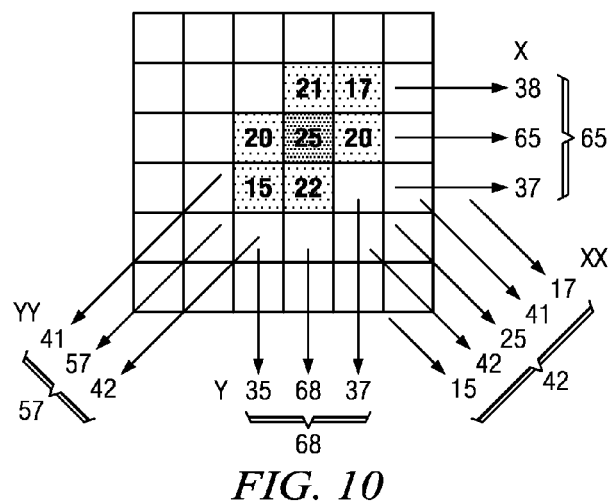
FIG. 10 schematically illustrates an example output data set from a 2D touch sensor for a single touch together with annotations relevant for computing shape data related to the touch.
Figure 12A:
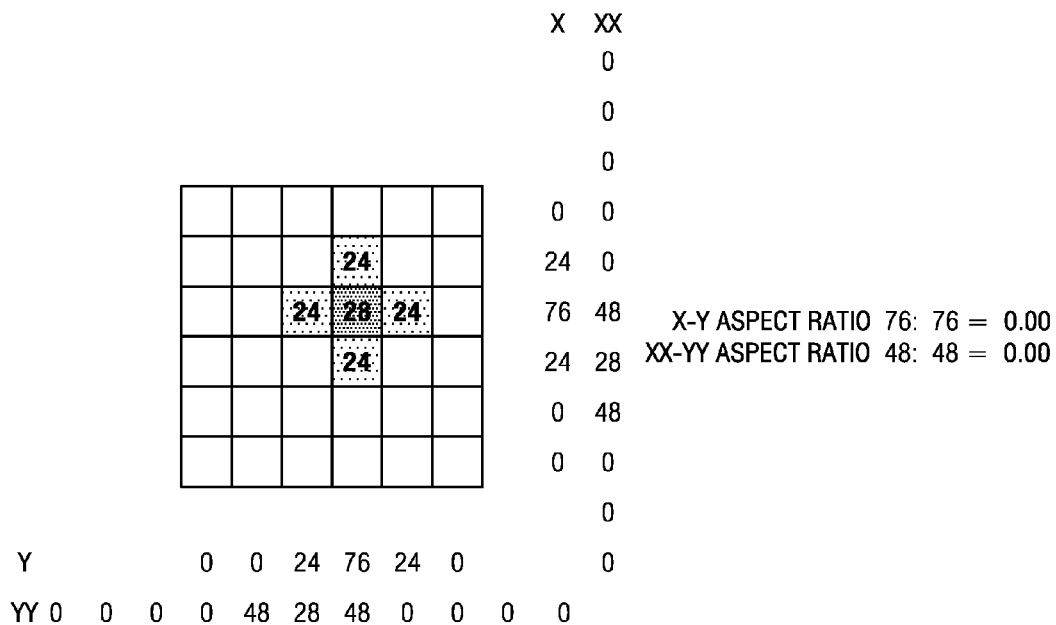
FIG. 12A to 12F illustrate different example output data sets from a 2D touch sensor together with annotations relevant for computing the touch shape vector.
Figure 12B:
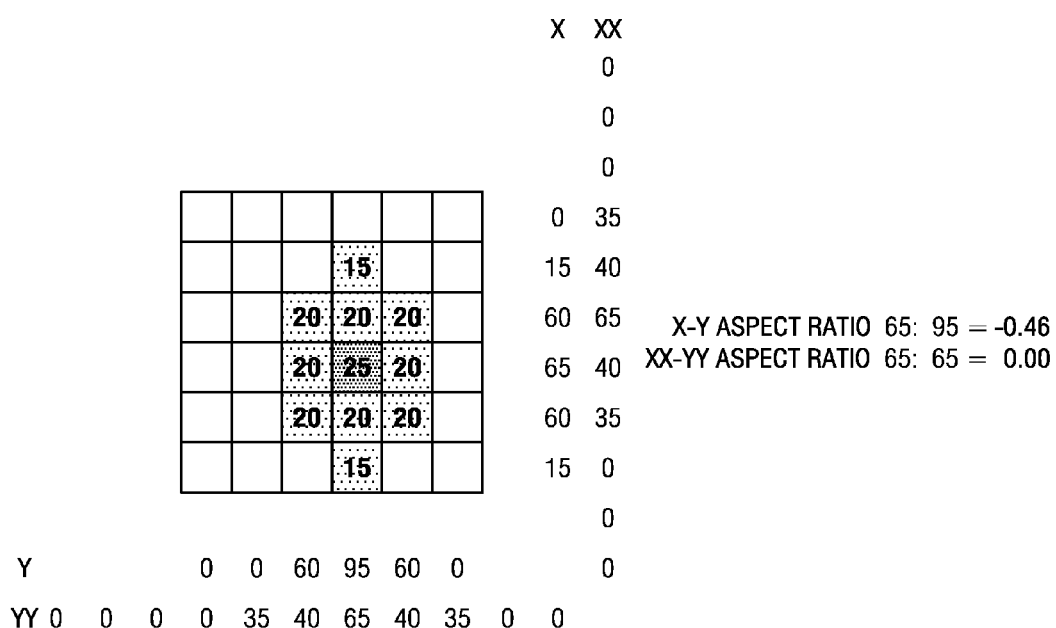
Figure 12C:
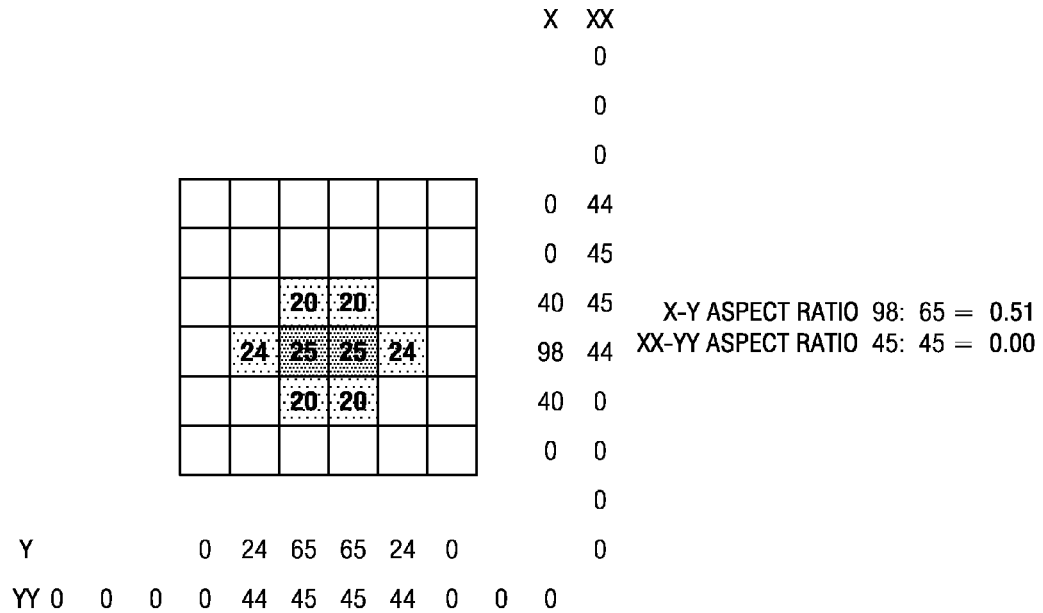
Figure 12D:
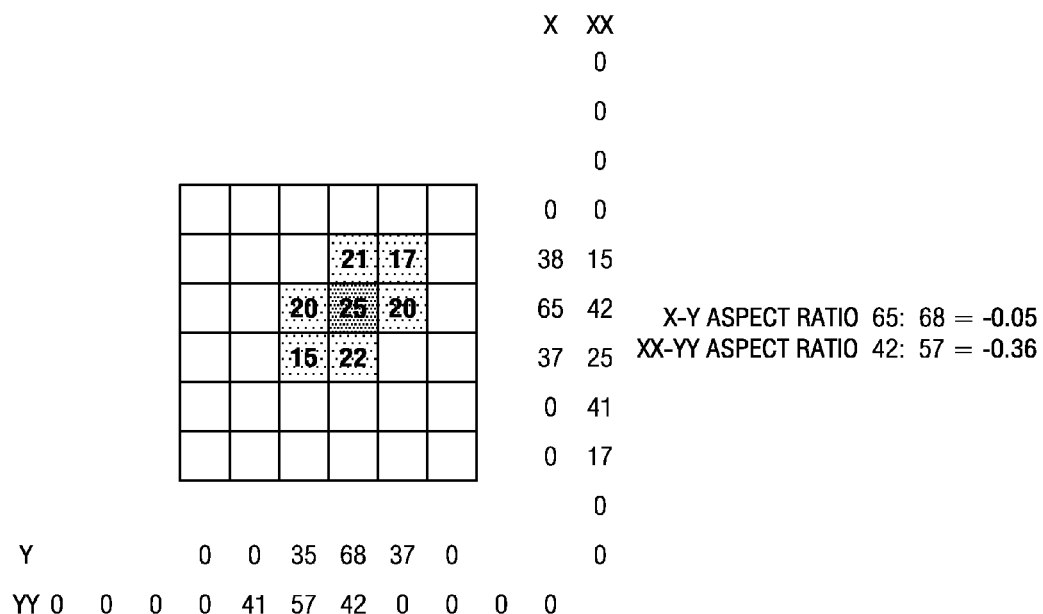

FIGS. 12A to 12F show six example data sets, with FIG. 12D reproducing the data set of FIG. 10 for ease of comparison of the nomenclature and layout of the numerical values.

FIG. 12A shows a circular-symmetry touch which therefore has a vector (0, 0) of zero magnitude and undefined direction.

FIG. 12B shows a symmetric ellipse aligned in North-South (NS). It can be seen that the XX-YY aspect ratio is zero, since the maximum sums in the two diagonal directions are equal, with the vector being made up solely of an X-Y component in a NS direction as would be expected.

FIG. 12C shows a symmetric ellipse aligned in West-East (WE). Once again the XX-YY aspect ratio is zero, since the maximum sums in the two diagonal directions are equal, with the vector being made up solely of an X-Y component in a WE direction as would be expected.

FIG. 12D shows an asymmetric ellipse aligned roughly NE-SW, this example being identical to FIG. 11 as already mentioned.

Figure 12E:
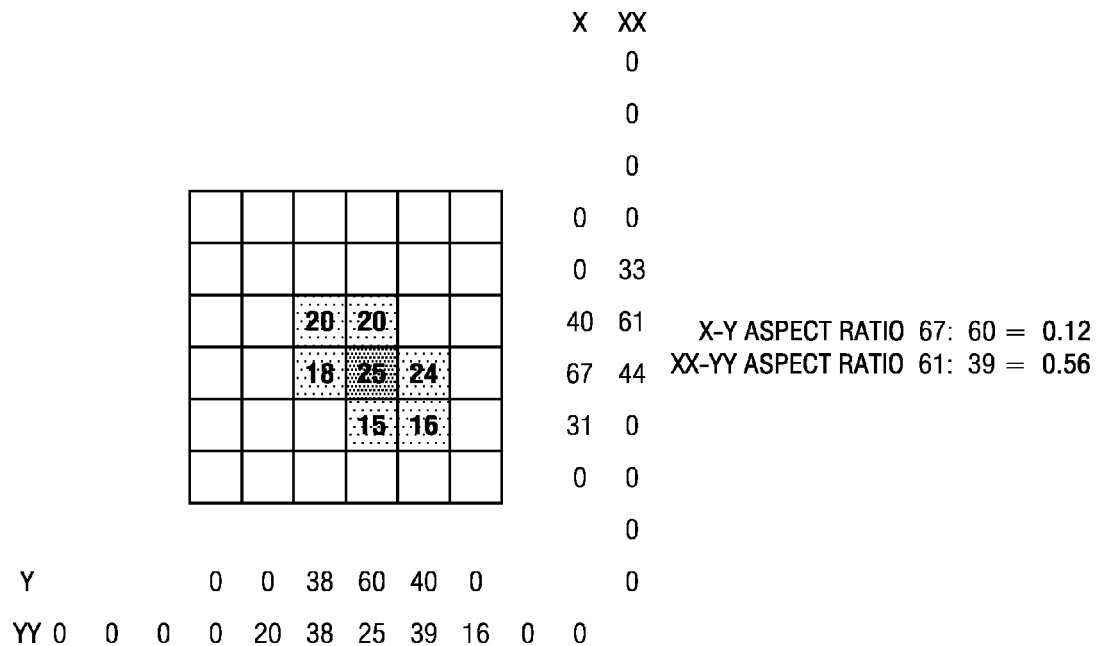

FIG. 12E shows an asymmetric ellipse aligned roughly NW-SE, with the signs of the vector components being opposite to the FIG. 12 example as a result of the changed alignment direction.

Figure 12F:
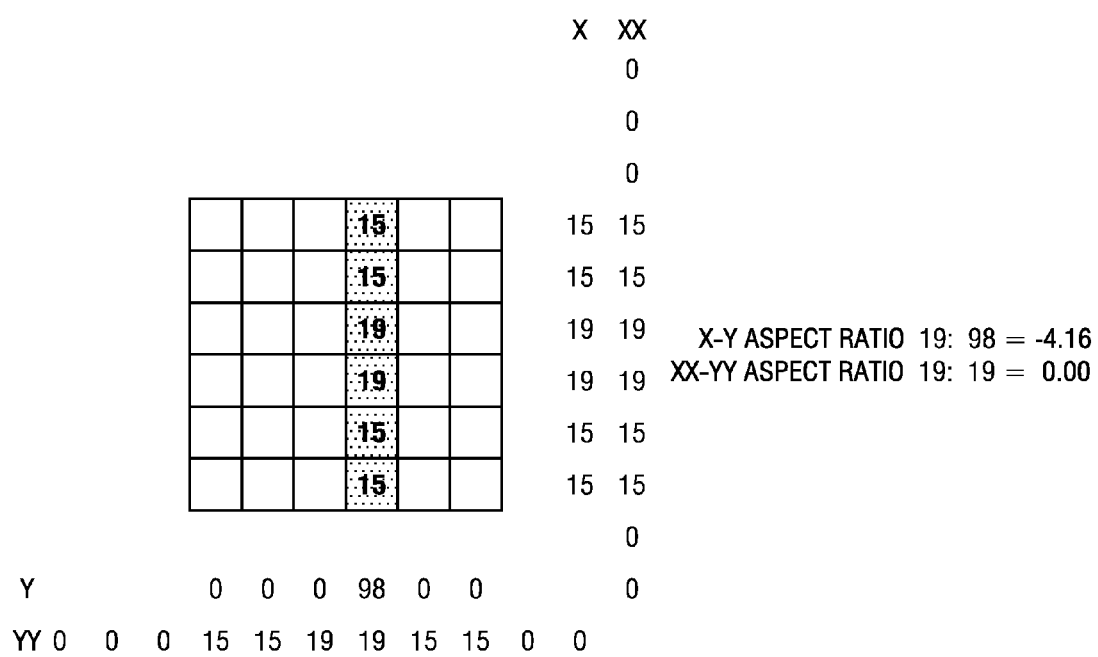

FIG. 12F shows an extreme elongate shape which therefore has a large vector magnitude of 4.16 indicating high ellipticity or "elongated-ness".

It will be appreciated that an angle and magnitude for the vector may be calculated conventionally by converting the Cartesian coordinate pair $(x_s, y_s)$ into polar coordinates $(r, \theta)$. In so doing it will be noted that the deduced angle value is actually twice the true angle. This is an artifact, since there is no directionality in the major axis of the "ellipse", so the measurable 180 degree variation is mapped onto 360 degrees for computational convenience.

The touch data acquisition unit 110 can be incorporated in a single logic device such as a microcontroller. The touch data recognition unit 120 may also be incorporated in a single logic device such as a microcontroller, which is preferably, but not necessarily, the same one as for the touch data acquisition unit 110, so both units are incorporated in a single microcontroller. The microcontroller may preferably have a push-pull type CMOS pin structure, and an input which can be made to act as a voltage comparator. Most common microcontroller I/O ports are capable of this, as they have a relatively fixed input threshold voltage as well as nearly ideal MOSFET switches. The necessary functions may be provided by a single general purpose programmable microprocessor, microcontroller or other integrated chip, for example a field programmable gate array (FPGA) or application specific integrated chip (ASIC).

The angle and magnitude of the shape vector can be used for various purposes. Some example applications are now described.

Touch position correction is an important application. Touch position correction is needed, since, when a user touches a key with a finger, there tends to be a systematic variation between the location the user intends to press, and the location which is registered as a touch by the touch sensor using the methods described above, for example based on the centre of mass of the touch.

Figure 13:
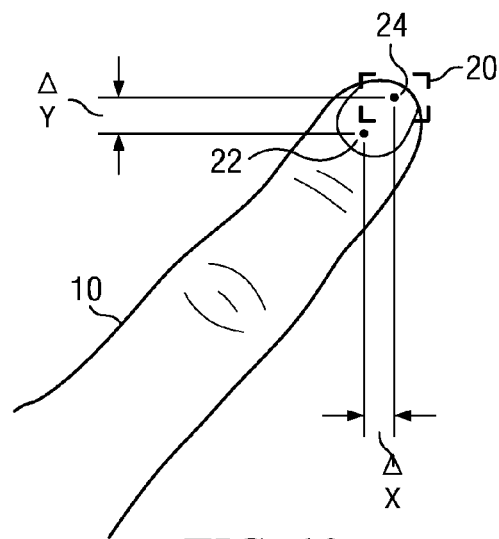
FIG. 13 shows a finger touching a virtual key on a 2D touch sensor to illustrate an application example of the shape data.

FIG. 13 illustrates a finger 10 positioned by a user to press a key 20, the corners of which are illustrated. The user perceives he has pressed at location 24, since he perceives his finger tip as being the significant location, whereas the touch sensor reports the touch location as location 22 which is the centre of the forger pad in contact with the sensor panel. The reported location (x, y) is offset from the intended touch location by $(\Delta x, \Delta y)$.

The offset has a definable magnitude 'r', where $r^2 = \Delta x^2 + \Delta y^2$ which follows from the size of a human finger. Moreover, the direction of the offset can be deduced from the angle of the reported shape vector. The pre-defined magnitude 'r' and the reported angle therefore define a vector in polar coordinate form that can be converted to Cartesian form to obtain values for $\Delta x$ and $\Delta y$. These can then be applied to modify the reported touch location, i.e.

$$(x_p, y_p) \rightarrow (x_p + \Delta x, y_p + \Delta y)$$

In more sophisticated implementations, the magnitude could be determined dynamically. For example, it could be scaled by the finger type (e.g. thumb, fore finger, middle finger etc.) and/or by finger size if these can be deduced by the sensor in use. For example, if a user can be recognized to be practicing touch typing, then the digits being used to press the keys of the QWERTY keyboard can be assumed.

The elongatedeness of the touch, i.e. the magnitude of the reported touch vector, can also be used to modify the processing. For example, if the touch vector is small, indicating an essentially round touch, then correction can be suppressed. Moreover, if the magnitude of the touch vector is above a significance threshold for touch position correction, then the magnitude of the correction can be scaled in some way with the magnitude of the touch vector.

Figure 14A:
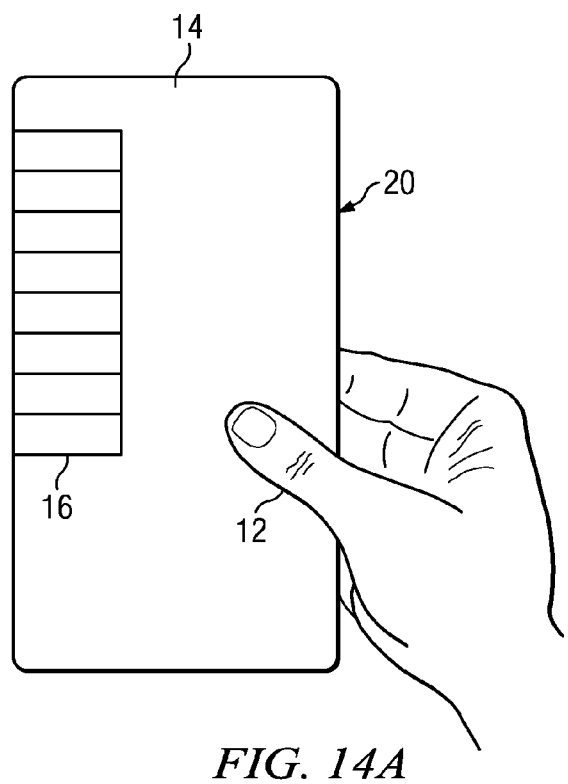

FIGS. 14A and 14B show a hand-held device 20 with a touch sensitive display panel 14 occupying substantially all of one face of the device. The hand-held device is designed when running at least some applications to assume that the device is being held by the user in one hand while touch input is performed by the other hand.

FIGS. 14A and 14B illustrate a user holding the device with his right and left hands respectively with the thumb of the relevant hand overlying the touch sensitive area. The provision of the shape vector allows the device to determine whether the device is being held by the left hand or the right hand, since there is a correlation between the position of the thumb of the holding hand, which is on one side region of the device and its angle. Namely, a touch in the right margin with a generally NW-SE orientation will indicate a right hand holding the device and a touch in the left margin with a generally NE-SW orientation will indicate a left hand holding the device. The thumb will also have a typical ellipticity factor, so that parameter can also be used for identifying whether the user is holding the device in the illustrated manner. Identification of this holding configuration can then be used by the application to configure the user display. For example, in the figure, user-selectable options 16 are displayed clipped to the opposite side of the display to which the user is holding the device.

FIG. 15 shows a hand held device 20 with a touch sensitive display panel 14 emulating in a lower portion 15 a QWERTY keyboard and in an upper portion a display window 17 for a text processor display. In a hand held device, such as a portable messaging device, the QWERTY keyboard is intended for two-thumb actuation.

The left thumb 12 will generally have a NE-SW orientation and the right thumb 13 a NW-SE orientation. This can be exploited to assist interpretation of two-touch inputs when the user is using the SHIFT or ALT keys. In the illustration, the user is pressing SHIFT-D. Use of the angular information can be used to discriminate the SHIFT actuation from the 'D' actuation and also to interpret it as a SHIFT actuation even if the left thumb strays away from the location of the virtual SHIFT key.

FIGS. 16A and 16B show a single finger 10 being moved on a touch screen device 20. The finger 10 has been rotated from a previous position 10'. In FIG. 16A, the finger 10 has been rotated towards the vertical, and in FIG. 16B away from the vertical. The provision of the angular information in the reported touch data means that a user rotating his finger over time can be interpreted as such directly, since there is a one-to-one mapping between the user's finger rotation and the rotation of the reported vector direction. Such a one-to-one mapping does not exist in a conventional touch panel which only reports touch positions. Gestures such as a single finger gesture to cause or indicate rotation are therefore not possible conventionally, whereas they are straightforward to implement with the present invention. Gestures that can have a parameter which can be mapped directly to the angular component of the reported shape vector include rotation and zoom in/out. In the case of a zoom gesture, rotation in a clockwise direction can be a zoom in proportional to the angular motion over time while rotation in a counterclockwise direction can be zoom out proportional to the angular motion over time. The opposite convention could also be adopted.

It is therefore possible to implement a one finger 'drag and rotate' gesture or a one finger 'drag and zoom' gesture which without the angular data would not be implementable without a two-touch input.

Figure 17:
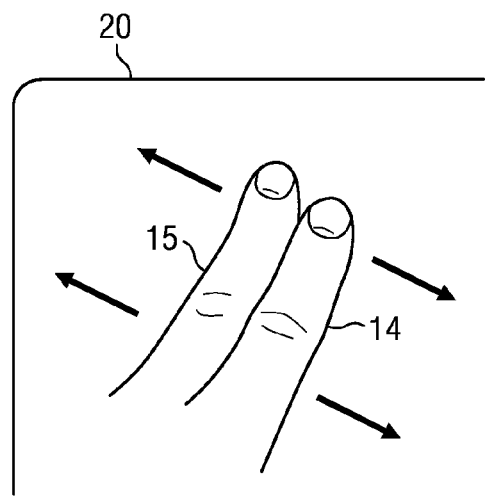
FIG. 17 shows two fingers of the same hand being moved laterally across a touch screen device to illustrate an application example of the shape data.

FIG. 17 shows the fore finger 14 and middle finger 15 of the same hand being moved laterally across a touch screen device 20. By virtue of the orientation data contained in the shape vector, gestures can be devised which are sensitive to the relative orientation of the finger(s) and their motion. Thus, in the illustrated example, it is possible for a gesture to be identified based on a two finger actuation, where the fact that the two fingers have parallel vectors allows it to be deduced they are from a single hand, and in which the gesture requires that the fingers are moved in a direction transverse to their orientation. This gesture could for example be defined to scroll up and down a document, where an 'up scroll' is motion to the left and a 'down scroll' is a motion to the right for a left handed actuation, whereas for a right handed actuation the opposite could be designated. The recognition of the handedness of a gesture allows the gesture recognition algorithm to recognize when the same gesture is being input by either the left or the right hand.

Figure 18A:
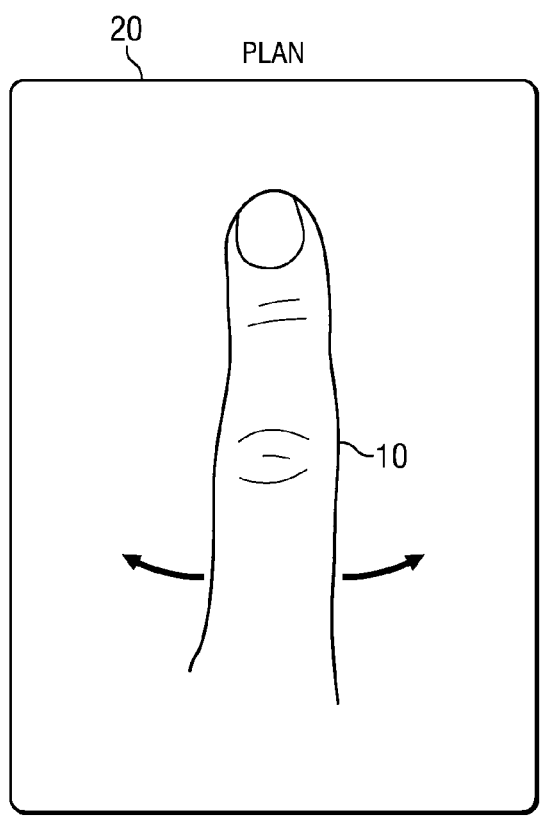
FIGS. 18A and 18B show plan and side views of a single finger actuating a touch screen device 20 to illustrate an application example of the shape data.
Figure 18B:
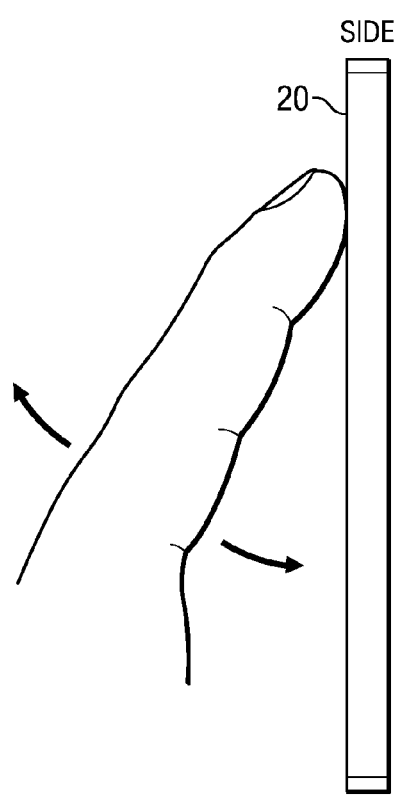

FIGS. 18A and 18B show plan and side views of a single finger 10 actuating a touch screen device 20. FIG. 18A essentially shows the same possibilities as described above with reference to FIGS. 16A and 16B. Namely, the possibility of a direct one-to-one mapping between finger orientation and a gesture parameter, so that a finger can be moved through an angle as illustrated by the arrows in FIG. 18A in order to control an angular parameter of a software application. This could be, for example, steering of a vehicle in a driving simulation, or navigation through a map or other 2D pattern. FIG. 18B shows further possibilities made possible by the shape vector. Namely, it is possible to follow changes in the angle of the finger to the plane of the touch panel as illustrated by the arrows in FIG. 18B. Although the touch sensor cannot directly measure such angular motion, it can infer it from changes in the shape of the finger pad on the touch sensor that follow from the angular motion of the finger. Namely, the smaller the angle between the finger and the panel, the more eccentric becomes the finger pad, and this is measurable through the ellipticity factor, i.e. the magnitude of the shape vector. With this new combination of being able to follow both angular motion as illustrated by the arrows in FIG. 18A and angular motion as illustrated by the arrows in FIG. 18B, new gestures become possible. In short, a single finger joystick functionality can be provided.

The two angular motions could be used to navigate through a complex 3D space being displayed using volume rendering, such as moving through mine workings or navigating along a body tube in a CT or MR volume data set, such as an artery or colon. In this case the two reported angles fully define a unique direction of travel in 3D space. Another gesture could map the rotation of FIG. 18A to an angular parameter in the software application, for example direction of travel of a vehicle (i.e. steering), while mapping the rotation of FIG. 18B to acceleration (i.e. throttle or walking speed). A single finger could then be used to navigate through a satellite navigation application or a street view application, for example, or to drive a vehicle in a vehicle simulation, such as are commonly provided in games.

As will be appreciated the provision of the vector data, in particular the angular data, with the position data opens up a plethora of new possibilities for new intuitive gestures. The provision of the vector data also greatly simplifies and improves the reliability of interpretation of known gestures such as:

Tap: A tap happens when the user quickly touches and releases the touch surface. No significant movement takes place while the user's finger is on the touch surface. It is characterized by a short touch duration. This could be used, for example, to activate a hyperlink on a displayed web page.

Double Tap: A double tap happens when the user quickly touches and releases the touch surface twice in quick succession. No significant movement takes place while the user's finger is on the touch surface, or between successive touches. It is characterized by short touch durations, and a short gap between the first release and the second press. This could be used, for example, to select a word in a displayed document.

Press: A press happens when the user touches and holds the touch surface. No significant movement takes place while the user's finger is on the touch surface. This could be used, for example, to select a number from a displayed numeric keypad. The same mechanism could be used to auto-repeat the selected number if the user continues to press on the displayed number.

Flick: A flick happens when the user quickly touches the touch surface, moves a short distance, and releases touch. It is characterized by a short touch duration. This could be used, for example, to display the next in a sequence of images.

Drag: A drag happens when the user touches the touch surface, moves their finger across the surface, and releases touch. It is characterized by a large movement across the touch surface. Depending on the application, multiple drag events may be generated as the user moves their finger. This could be used, for example, to select a sentence in a displayed document.

Pinch: A pinch happens when the user places two fingers on the touch surface, and then moves them towards each other. This could be used, for example, to zoom out on a displayed image.

Stretch: A stretch happens when the user places two fingers on the touch surface, and then moves them away from each other. This could be used, for example, to zoom in on a displayed image.

Rotate: A rotate operation happens when the user places two fingers on the touch surface, and then rotates them relative to each other. This could be used, for example, to rotate a displayed image.

In summary, shape data of multi-node "patch" touches are used to deduce the approximate angle of the touching object to the XY axes and its ellipticity. These data can be reported as a Cartesian or polar coordinate alongside the conventional location data. The calculation of the shape vector can use a modified centroid type algorithm or other well known method to compute the approximate degree of elongation of the contact patch of touching object. Once this elongation is known, then major axis of the patch gives a measure of the angle relative to the XY axes. The length of the major axis also serves as a useful "degree of elongated-ness" and so can be used by the host processor to "grade" how reliable the reported angle is. For example, a vertical touch will not yield a useful angle because the touch patch is almost round and in the case the major axis will effectively be zero length. The vector magnitude can therefore be used as a "confidence factor" for the reported angle.

It will be appreciated that the touch sensor forming the basis for the above described embodiment is an example of a so-called active, or transverse electrode, capacitive sensor. However, the invention is also applicable to so-called passive, or single ended, capacitive sensor arrays. Passive capacitive sensing devices rely on measuring the capacitance of a sensing electrode to a system reference potential (earth). The principles underlying this technique are described in U.S. Pat. No. 5,730,165 and U.S. Pat. No. 6,466,036, for example in the context of discrete (single node) measurements.

The Abstract is provided to comply with 37 C.F.R. §1.72(b), and is submitted with the understanding that it will not be used to interpret or limit the scope or meaning of the claims.

What is claimed is:

1. A method of sensing touches on a touch sensor, the method comprising:
   acquiring a frame of touch signal values from sensing nodes of a touch sensor having a two-dimensional array of sensing nodes distributed over a sensing area;
   processing the touch signal values to detect at least one touch in the frame, each touch being formed of a contiguous group of one or more sensing nodes;
   computing for each touch its touch location on the sensing area by processing the touch signal values of the touch;
   computing for each touch a touch angle indicative of orientation of the touch on the sensing area by processing the touch signal values of the touch;
   outputting for each frame frame data including the touch location and the touch angle;
   computing for each touch a touch ellipticity factor indicative of how elongate a shape is possessed by the touch by processing the touch signal values of the touch;
   outputting for each frame as part of the frame data the touch ellipticity factor;
   processing the frame data over time;
   identifying, using a gesture processing algorithm, gestures from the frame data, wherein the gesture processing algorithm includes recognition for at least one gesture which jointly processes the touch angle and touch ellipticity factor, using the magnitude of the touch ellipticity factor to determine angular precision of the touch angle; and
   outputting gesture data.

2. The method of claim 1, wherein the touch location is translated by a correction distance and in a correction direction determined respectively from the touch ellipticity factor and the touch angle.

3. The method of claim 1, wherein the gesture processing algorithm includes recognition for at least one gesture having a parameter with a mapping to the touch angle.

4. The method of claim 1, wherein the gesture processing algorithm is operable to determine whether the touch is from a left hand or a right hand based on the touch angle.

5. The method of claim 1, wherein the gesture recognition algorithm includes recognition for at least one gesture based on analysis of the touch angle and the touch location over time such that motion of the touch location in a direction generally transverse to the touch angle of the touch is recognized as a lateral sliding or rocking motion of a finger.

6. The method of claim 1, wherein the gesture processing algorithm includes recognition for at least one gesture having a parameter with a mapping to the touch ellipticity factor.

7. The method of claim 1, wherein the gesture processing algorithm is operable to determine whether the touch is from a thumb or a finger based on the touch ellipticity factor.

8. The method of claim 1, wherein the gesture processing algorithm includes recognition for at least one gesture based on analysis of the touch ellipticity factor and touch location over time such that change in the touch ellipticity factor while the touch location is relatively constant is recognized as a vertical rocking motion of a finger in which the angle of the finger to the plane of the sensing area is being varied.

9. The method of claim 1, wherein the touch sensor is a capacitive touch sensor.

10. A touch sensor, comprising:
    a two-dimensional array of sensing nodes distributed over a sensing area;
    a measurement circuit operable to acquire frames of touch signal values from the sensing nodes; and
    a processing unit operable to:
      process the touch signal values to detect at least one touch in the frame, each touch being formed of a contiguous group of one or more sensing nodes;
      compute for each touch its touch location on the sensing area by processing the touch signal values of the touch;
      compute for each touch a touch angle indicative of orientation of the touch on the sensing area by processing the touch signal values of the touch; and
      output for each frame frame data including the touch location and the touch angle;
      compute for each touch a touch ellipticity factor indicative of how elongate a shape is possessed by the touch by processing the touch signal values of the touch;
      output for each frame as part of the frame data the touch ellipticity factor;
      identify, using a gesture processing algorithm, gestures from the frame data, wherein the gesture processing algorithm includes recognition for at least one gesture which jointly processes the touch angle and touch ellipticity factor, using the magnitude of the touch ellipticity factor to determine angular precision of the touch angle; and
      output gesture data.

11. The touch sensor of claim 10, wherein the processing unit is further operable to translate the touch location by a correction distance and in a correction direction determined respectively from the touch ellipticity factor and the touch angle.

12. The touch sensor of claim 10, wherein the gesture processing algorithm includes recognition for at least one gesture having a parameter with a mapping to the touch angle.

13. The touch sensor of claim 10, wherein the gesture processing algorithm includes recognition for at least one gesture having a parameter with a mapping to the touch ellipticity factor.

14. The touch sensor of claim 10, wherein the gesture processing algorithm is operable to determine whether the touch is from a thumb or a finger based on the touch ellipticity factor.

15. The touch sensor of claim 10, wherein the gesture processing algorithm includes recognition for at least one gesture based on analysis of the touch ellipticity factor and touch location over time such that change in the touch ellipticity factor while the touch location is relatively constant is recognized as a vertical rocking motion of a finger in which the angle of the finger to the plane of the sensing area is being varied.

16. A device comprising:

a touch sensor, comprising:

a two-dimensional array of sensing nodes distributed over a sensing area;

a measurement circuit operable to acquire frames of touch signal values from the sensing nodes; and a processing unit operable to:

process the touch signal values to detect at least one touch in the frame, each touch being formed of a contiguous group of one or more sensing nodes;

compute for each touch its touch location on the sensing area by processing the touch signal values of the touch;

compute for each touch a touch angle indicative of orientation of the touch on the sensing area by processing the touch signal values of the touch;

output for each frame frame data including the touch location and the touch angle;

compute for each touch a touch ellipticity factor indicative of how elongate a shape is possessed by the touch by processing the touch signal values of the touch; and output for each frame as part of the frame data the touch ellipticity factor; and a gesture processor operable to:

identify, using a gesture processing algorithm, gestures from the frame data, wherein the gesture processing algorithm includes recognition for at least one gesture which jointly processes the touch angle and touch ellipticity factor, using the magnitude of the touch ellipticity factor to determine angular precision of the touch angle; and output gesture data.

17. The device of claim 16, wherein the processing unit is further operable to translate the touch location by a correction distance and in a correction direction determined respectively from the touch ellipticity factor and the touch angle.

18. The device of claim 16, wherein the gesture processing algorithm includes recognition for at least one gesture having a parameter with a mapping to the touch ellipticity factor.

19. The device of claim 16, wherein the gesture processing algorithm is operable to determine whether the touch is from a thumb or a finger based on the touch ellipticity factor.

20. The device of claim 16, wherein the gesture processing algorithm includes recognition for at least one gesture based on analysis of the touch ellipticity factor and touch location over time such that change in the touch ellipticity factor while the touch location is relatively constant is recognized as a vertical rocking motion of a finger in which the angle of the finger to the plane of the sensing area is being varied.

\* \* \* \* \*

UNITED STATES PATENT AND TRADEMARK OFFICE
CERTIFICATE OF CORRECTION

PATENT NO.          : 8,154,529 B2                                          Page 1 of 1
APPLICATION NO.     : 12/466270
DATED               : April 10, 2012
INVENTOR(S)         : Peter Sleeman It is certified that error appears in the above-identified patent and that said Letters Patent is hereby corrected as shown below:

In the Claims

Claim 10, Col. 20, Ln. 28-29: After "touch;" and before "output" delete "and".

Signed and Sealed this
Seventh Day of October, 2014

Michelle K. Lee
*Deputy Director of the United States Patent and Trademark Office*